United States Patent
Chase et al.

(10) Patent No.: US 8,409,448 B2
(45) Date of Patent: Apr. 2, 2013

(54) MIXED HYDROPHILIC/HYDROPHOBIC FIBER MEDIA FOR LIQUID-LIQUID COALESCENCE

(75) Inventors: George Chase, Wadsworth, OH (US); Prashant Kulkarni, Akron, OH (US)

(73) Assignee: The University of Akron, Akron, OH (US)

( * ) Notice: Subject to any disclaimer, the term of this patent is extended or adjusted under 35 U.S.C. 154(b) by 528 days.

(21) Appl. No.: 12/655,823

(22) Filed: Jan. 7, 2010

(65) Prior Publication Data

US 2010/0200512 A1      Aug. 12, 2010

Related U.S. Application Data

(60) Provisional application No. 61/144,226, filed on Jan. 13, 2009.

(51) Int. Cl.
*B01D 37/00* (2006.01)
*B01D 17/022* (2006.01)
*B01D 17/04* (2006.01)
*B01D 39/04* (2006.01)
*B01D 39/06* (2006.01)

(52) U.S. Cl. ........ 210/799; 210/505; 210/508; 210/509; 210/DIG. 5

(58) Field of Classification Search .................. None
See application file for complete search history.

(56) References Cited

U.S. PATENT DOCUMENTS

| 5,102,745 A | 4/1992 | Tatarchuk et al. | |
|---|---|---|---|
| 2010/0200512 A1 * | 8/2010 | Chase et al. ................ | 210/708 |

OTHER PUBLICATIONS

Spielman, Lloyd A. et al., "A review of progress in the coalescence of liquid—liquid suspension and a new theoretical framework for Coalescence by porous media are presented" *Industrial and Engineering Chemistry*, vol. 62, No. 10, Oct. 10-24, 1970.

Brown, Jr, R. L..et al., Improve suspended water removal from fuels: A better understanding of molecular forces enhances free water separator selection Pall Corp., East Hills, NY from *Hydrocarbon Processing®*, Dec. 1993.

Shin, C. et al. "The effect of wettability on drop attachment to glass rods", *Journal of Fluid Particle Separation*, vol. 16, No. 1, 1-7, 2004.

(Continued)

*Primary Examiner* — Robert James Popovics
(74) *Attorney, Agent, or Firm* — Renner Kenner Greive Bobak Taylor & Weber

(57) ABSTRACT

An immiscible lipophilic or hydrophilic liquid phase separated respectively from a continuous hydrophilic phase or a lipophilic phase liquid. Fibers having hydrophilic and hydrophobic properties are mixed, layered, etc., and formed into a filter. The separation mechanism involves capture of small droplets of the immiscible phase, coalescence of the small droplets into larger droplets as the immiscible liquid flows through the fiber filter, and release of the large immiscible droplets from the filter. With respect to separation of a hydrophilic immiscible fluid such as water in a lipophilic continuous fluid such as oil, the hydrophobic fibers will cause small water droplets to migrate towards the hydrophilic fibers whereby large droplets are formed on hydrophilic surface. The large droplets stay on hydrophilic fiber surface for extended periods of time and continue to coalescence until they are so large that they can no longer be maintained by the hydrophilic fibers and are released and drained off of the filter. In designing such filter, wettability of the filter media is an important parameter. The filter media can be designed by mixing hydrophilic and hydrophobic fibers in various proportions to achieve an optimum wettability range for separation of the immiscible liquid from the continuous phase liquid. The wettability of filter media can be characterized by a modified Washburn Equation.

6 Claims, 9 Drawing Sheets

OTHER PUBLICATIONS

Speth., Hauke et al., "Coalescence of secondary dispersions in fiber beds", *Separation and Purzjication Technology*, vol. 29, 113-119, 2002.

Sokolovic, Secerov, et al., "Effect of the Nature of Different Polymeric Fibers on Steady-State Bed Coalescence of an Oil-in-Water Emulsion", *Industrial & Engineering Chemistry Research* vol. 43 (20), 6490-6495, 2004.

Moorthy, K. et. al., "Effect of Wettability on liquid-liquid coalescence", *AFS Conference* Ann Harbor, Sep. 2005.

Erbil H. Y., et al., "Transformation of a simple plastic into a superhydrophobic surface", *Science*, vol. 299, 1377-1380, 2003.

Washburn E.W, "The dynamics of capillary flow", *The American Physical Society*, vol. XVII, No. 3, 273-283.

Murata, T. et al., "A modified penetration rate method for measuring the wettability of Coal Powders", *Journal of Japan Oil and Chemists Society*, vol. 32 (9), 498-502, 1983.

Kondo, Hiroshi, et al.,"Lipid compounds in the sediment cores of Lake Kawahara Oike, pagasaki Prefecture, Japan], documenting its change from brackish water to fresh water", *Daigaku Kyoikugakubu Shizen Kagaku Kenkyu Hokoku*, vol. 49 13-25, (1993).

Voyutskii et al., "Mechanism of separation of disperse phase of emulsions during filtration", Dokl. Akad. Nauk SSSR, 91 (1953), 1155.

Hazlett R.N., "Fibrous Bed coalescence of water", I & EC Fundamentals, vol. 8, No. 4, (1969), 625-632.

Clayfield et al, "The Coalescence of secondary dispersions", Journal of Colloid and Interface Science, vol. 104, No. 2, (1985), 500-511.

Moses et al., A visual study of the breakdown of emulsions in porous coalescers, Chem. Eng. Sci., vol. 40, No. 12, (1985) pp. 2339-2350.

Basu S,"A Study on effect of wetting on mechanism of coalescence in a model coalescer", Journal of Colloid and Interface Science, 159 (1993), 68-76.

Ding B. et al., Conversion of an electro-sound nanofibrous cellulose acetate mat from a super-hydrophilic to super-hydrophobic surface, Nanotechnology, 17 (2006) 4332-4339.

Mane R. S, et al., A simple and low temperature process for super-hydrophilic Rutile $TiO_2$ thin films growth, Applied Surface Science, 253 (2006) 581-585.

Ren D, et al., Study on the Superhydrophilicity of the $SiO_2$-$TiO_2$ thin films prepared by sol-gel method at room temperature, J. of Sol-gel Science and Technology, 29 (2004) 13 1-136.

Guo Z, et al., Stable bio-mimetic Super-hydrophobic engineering materials, JACS Communications, 127 (2005) 15670-15671.

Ma Ying., et al., Fabrication of super-hydrophobic film from PMMA with intrinsic contact angle below 90'. Polymer, 48 (2007) 7455-7460.

Van Der Wal P., et al., Super-hydrophobic surfaces made from Teflon, Soft Matter, 3 (2007) 426-429.

Feng X, et al., Reversible super-hydrophobicity to super-hydrophlicity transition of aligned ZnO nano-rod films, JACS Comm. 126 (2004) 62-63.

Ma M., et al., Electrospun Poly (Styrene-block-dimetylsiloxane) block copolymer fibers exhibiting superhydophobicity., Langmuir, 21 (2005) 5549-5554.

Onda T, et al., Super-water-repellent fractal surfaces, Langmuir, vol. 12 No. 9 (1996) 2125-2127.

Mohammadi R., et al., Effect of surfactants on wetting of super-hydrophobic surfaces, Langmuir, 20 (2004) 9657-9662.

Zhang X., et al., A transparent and photo-patternable superhydrophobic film., Chem. Comm (2007) 4949-4951.

Tadanaga K., et al..., Formation of superhydrophobicsuperhydrophilic pattern on flowerlike Alumina thin film by Sol-gel method., J. of Sol-Gel Science and Tech, 19 (2000) 21 1-214.

\* cited by examiner

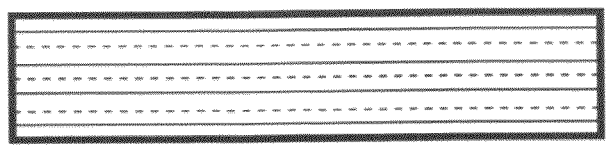
FIG 3 (a)
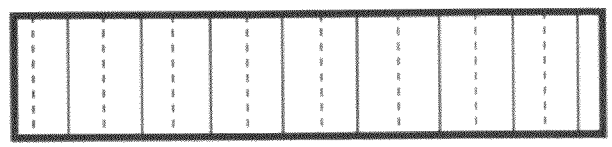
FIG. 3 (b)
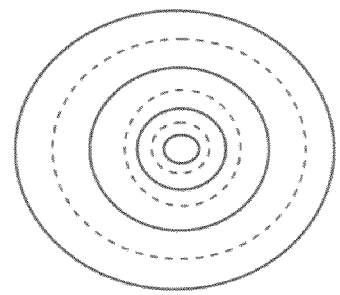
FIG. 3 (c)
FIG. 3
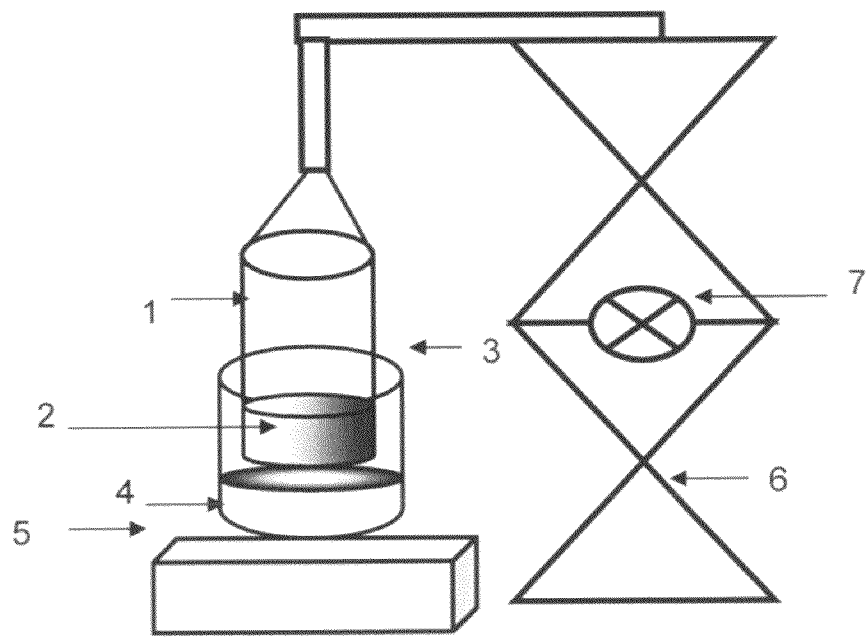
FIG. 4

FIG. 15

FILTER MEDIA PREPARATION

Layered Filter Media

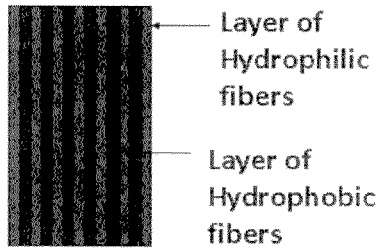
— Layer of Hydrophilic fibers
— Layer of Hydrophobic fibers

⇩

Polypropylene Slurry
-PP fibers + + PE binder fibers (25 wt.%)
-Mix in blender with 0.5 L water.
-Dilute with 2.5 L of water and stir for 30 min. in separate container.

⇩

Micro-glass fiber Slurry
-Micro-glass fibers + 3 L water.
-Stir for 30 min.
-Megasol S50 (100 Vol%) + starch (15 wt.%).
-Stir for 5 min.

⇩

Vacuum Molding
-Add 250-300 ml of each slurry one over another.
-Vacuum mold through fine mesh (pressure 15 psi).

⇩

Heating to set binders
-Heat at 126 C for 3-4 min.
-Heat at 100 C for 2 hrs.
-Wrap heat shrink tubing around filter media and heat till to form well packed structure.

Mixed Filter Media

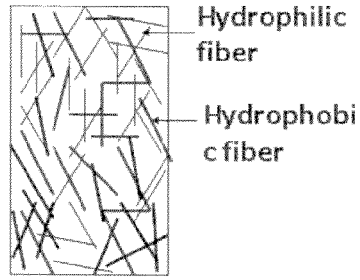
— Hydrophilic fiber
— Hydrophobic fiber

⇩

Polypropylene Slurry Preparation
-PP fibers + + PE binder fibers (25 wt.%)
-Mix in blender with 0.5 L water.
-Dilute with 1 L of water and stir for 30 min. in separate container.

⇩

Micro-glass fiber Slurry
-Micro-glass fibers + 4 L water.
-Stir for 30 min.
-Megasol S50 (100 Vol%) + starch (15 wt.%).
-Stir for 5 min.

⇩

Vacuum Molding
-Add PP fiber slurry in a tank first and circulate it for 2 min.
-Add micro-glass fiber slurry with constant flow rate of 100-150 m./min.
-Apply vacuum immediately after addition of glass fiber slurry is started.
-Vacuum mold through fine mesh (pressure 15 psi).

⇩

Heating to set binders
-Heat at 126 C for 3-4 min.
-Heat at 100 C for 2 hrs.
-Wrap heat shrink tubing around filter media and heat till to form well packed structure.

MIXED HYDROPHILIC/HYDROPHOBIC FIBER MEDIA FOR LIQUID-LIQUID COALESCENCE

CROSS REFERENCE

This patent application claims the benefit and priority of U.S. provisional application 61/144,226, filed Jan. 13, 2009 for CONTROL OF MEDIA WETTABILITY BY MIXING FIBERS, which is hereby fully incorporated by reference.

FIELD OF THE INVENTION

The present invention relates to the wettability of an immiscible liquid (e.g. emulsion) such as water in a continuous phase liquid such as oil utilizing a filter that has significant influence on the water removal efficiency. Wettability is an important parameter in designing such filter media. The wettability of the filter media is mainly governed by surface properties of fiber material and porosity of filter. The surface properties of filter can be expressed in terms of hydrophilic or hydrophobic nature of the filter. The wettability of the filter can be characterized using the concept of Lipophilic to Hydrophilic ratio (L/H) by using a modified Washburn equation that is based on capillary rise phenomena. Oil and water are used as reference liquids in the wettability characterization. In liquid-liquid coalescence filtration, separation efficiency depends on various factors including face velocity, fiber structures, fiber geometry, fiber orientations, etc., and also wettability of filter especially when interfacial tension between liquid phases is low. The hydrophilic and hydrophobic fibers used in the filter capture the immiscible liquid and form drops on the hydrophilic material that stay on the fiber surface for extended periods of time. Fibers having varying hydrophilic and hydrophobic properties can be mixed into filter media, so that the hydrophobic fibers will aid in drop migration towards the hydrophilic fibers and the formation of large drops on the hydrophilic surface. Large drops are desired for coalescence and drainage.

The hydrophilic/hydrophobic filters can be utilized in the petrochemical industry as well as for fuels for vehicles including automobiles, planes, trains, and ships.

BACKGROUND OF THE INVENTION

In recent years, separation of water-in-oil emulsions has become industrially important. Water present in liquid fuels can combine with chemicals in fuels, such as sulfur, to form corrosive compounds which can damage sensitive engine parts. Corrosion is a major cause of reduction of engine life and efficiency. In addition, surfactants present in liquid fuels lower the interfacial tension between water and fuel and the problem of separation becomes more insidious. This can also cause a product to be off-specification due to haze and color [1, 2]. The water is present in fuels as primary emulsions with drop sizes greater than 100 um and as secondary emulsions with drop sizes less than 100 um. The separation of primary emulsions is often accomplished by gravity settling or mechanical means. However, coalescence filtration using fibrous filters is an efficient and economical way to separate secondary dispersions.

The coalescence process occurs in three main steps. First, the fibrous bed captures water droplets. Second, the collected water phase migrates through the bed and coalesces. Third, the enlarged droplets are released from the fiber surfaces [3]. Coalescer performance is generally characterized by separation efficiency and pressure drop. The separation efficiency is highly dependent on the characteristic properties of the dispersions (e.g. composition, density, viscosity drop size) and the fiber bed (material, diameter, surface structure, porosity) [4]. Flow rate is an important factor in water-in-oil dispersion flow, as it controls the capture mechanism and capture probability of droplets and the distribution of the dispersed phase. [3].

Shin [3] shows that wettability of the surface has effect on drop attachment on silane coated glass rods. It is known that critical surface tension of a solid to the liquid surface tension determines the character of solid wettability [5]. Wettability of filter medium can be represented by its hydrophobic or hydrophilic behavior. Moorthy [6] performed the coalescence experiments with surface functionalized filter media and showed that intermediate wettability gives better performance.

Research results and common experience in industry show that coalescing filters work best with an intermediate wettability. If the medium is too wetting it tends to load up with liquid drops which restricts the air flow and results in an undesired high pressure drop. If the medium is too non-wetting the droplets captured on the fibers quickly move along the fibers or leave the fibers before they have a chance to coalesce and hence the separation is not efficient.

Common practice to control the wettability is by selecting a material from which the fibers are made that has an intermediate wettability, or by applying a coating, such as silanes, that gives the surface of the fiber structures the intermediate wettability. The difficulty here is finding the right material or coating that has the best wettability for a given application. This approach does not allow for incremental changes in wettability.

The above-noted references as well as others are as follows:

1. Lloyd A. Spielman et al., "A review of progress in the coalescence of liquid-liquid suspension and a new theoretical framework for Coalescence by porous media are presented" *Industrial and Engineering Chemistry*, Vol. 62, No. 10, 10-24 Oct. 1970.
2. Improve suspended water removal from fuels: A better understanding of molecular forces enhances free water separator selection R. L. Brown, Jr., et al., *Pall Corp., East Hills, N.Y. from Hydrocarbon Processing®, December* 1993.
3. C. Shin and G. G. Chase "The effect of wettability on drop attachment to glass rods", *Journal of Fluid Particle Separation*, Vol. 16, No. 1, 1-7, 2004.
4. Hauke Speth., et al., "Coalescence of secondary dispersions in fiber beds", *Separation and Purzjication Technology*, Vol. 29, 113-119, 2002.
5. Secerov Sokolovic, et al., "Effect of the Nature of Different Polymeric Fibers on Steady-State Bed Coalescence of an Oil-in-Water Emulsion", *Industrial & Engineering Chemistry Research* Vol. 43 (20), 6490-6495, 2004.
6. K. Moorthy, et. al., "Effect of Wettability on liquid-liquid coalescence", *AFS Conference* Ann Harbor, September 2005.
7. Erbil H. Y., et al., "Transformation of simple surface into super-hydrophobic surface", *Science*, Vol. 299, 1377-1380, 2003.
8. Washburn E. W, "The dynamics of capillary flow", *The American Physical Society*, VOX~V II, No. 3, 374-375.
9. Murata Toshiaki et al., "A modified penetration rate for measuring the wettability of Coal Powders", *Journal of Japan Oil and Chemists Society*, Vol. 32 (9), 498-502, 1983.

10. Kondo, Hiroshi, et al., "Lipid compounds in the sediment cores of Lake Kawahara Oike, pagasaki Prefecture, Japan], documenting its change from brackish water to fresh water", *Daigaku Kyoikugakubu Shizen Kagaku Kenkyu Hokoku*, Vol. 49 13-25, (1993).
11. Voyutskii et al., (1953 Voyutskii, S. S, Akl'yanova, K. A., Panich, R., Fodiman, N., "Mechanism of separation of disperse phase of emulsions during filtration", Dokl. Akad. Nauk SSSR, 91 (1953), 1155
12. Hazlett (1969) Hazlett, R. N., "Fibrous Bed coalescence of water", I & EC Fundamentals, 8 (1969), 625
13. Clayfield et al, (1984) Clayfield, E. J, Dixon, A. G, Foulds, A. W and Miller, R. J. L, "Coalescence of secondaryemulsions", Journal of Colloid and Interface Science, 104 (1985), 498
14. Moses and Fg (1985) Moses, S. F. and Ng, K. M. (1985) A visual study of the breakdown of emulsions in porous coalescers. Chem. Eng. Sci., 40 (12): 2339-2350.
15. Basu (1993) Basu, S, "A Study on effect of wetting on mechanism of coalescence in a model coalescer", Journal of Colloid and Interface Science, 159 (1993), 68
16. Bin Ding, et al., Conversion of an electro-sound nanofibrous cellulose acetate mat from a super-hydrophilic to super-hydrophobic surface. Nanotechnology 17 (2006) 4332-4339
17. Mane R. S, et al., A simple and low temperature process for super-hydrophilic Rutile $TiO_2$ thin films growth, Applied Surface Science, 253 (2006) 581-585
18. Ren D, et al., Study on the Superhydrophilicity of the $SiO_2$-$TiO_2$ thin films prepared by sol-gel method at room temperature, J. of Sol-gel Science and Technology, 29 (2004) 13 1-136
19. Guo Z, et al., Stable bio-mimetic Super-hydrophobic engineering materials, JACS Communications 127 (2005) 15670-15671
20. Ma Y., et al., Fabrication of super-hydrophobic film from PMMA with intrinsic contact angle below 90'. Polymer 48 (2007) 7455-7460
21. Van der wal P., et al., Super-hydrophobic surfaces made from Teflon, Soft Matter 3 (2007) 426-429
22. Feng X, et al., Reversible superhydrophobicity to superhydrophlicity transition of aligned ZnO nano-rod films, JACS Communication 126 (2004) 62-63
23. Ma M., et al., Electrospun Poly (Styrene-block-dimethylsiloxane) block copolymer fibers exhibiting superhydophobicity, Langmuir, 21 (2005) 5549-5554
24. Onda T, et al., Super-water-repellent fractal surfaces, Langmuir, Vol. 12 Number 9 (1996) 2125-2127
25. Mohammadi R., et al., Effect of surfactants on wetting of super-hydrophobic surfaces., Langmuir, 20 (2004) 9657-9662
26. Zhang X., et al., A transparent and photo-patternable super-hydrophobic film., Chem. Commun (2007) 4949-4951
27. Tadanaga K., Morinaga J., Minami T., Formation of superhydrophobicsuperhydrophilic pattern on flowerlike Alumina thin film by Sol-gel method., J. of Sol-Gel Science and Technology 19 (2000) 21 1-214
28. U.S. Pat. No. 5,102,745, granted Apr. 7, 1992 to Tatarchuk et al.

SUMMARY OF THE INVENTION

Coalescing filters are used to remove small liquid droplets from immiscible liquids and also gases. The droplets are carried into the filter by the flow of the continuous phase where the droplets collide with fine fibers. The droplets are captured on the fibers, coalesce to form larger drops, and the larger drops migrate to the exit surface of the medium. The larger drops are subsequently separated from the gas as by gravity settling.

An aspect of the present invention is to develop filters that can vary with respect to the wettability values thereof by using the different micron sized fibers with hydrophilic and hydrophobic properties. Wettability of a liquid on a flat surface can be related to contact angle and surface tension (or surface energy). Liquids on a high surface energy material have low contact angles (approaching zero) and tend to spread across the surface. Low surface energy materials have high contact angles in the range of from about 90 to about 180 degrees. Polypropylene fibers were selected as hydrophobic fibers (contact angle with water ~104°) [7] and micro glass fibers are the hydrophilic fibers (contact angle with water ~0°) [6]. The filter media has been prepared with different compositions of micro glass and short cut polypropylene fibers. The filter media has been also characterized for their permeability and porosity and effect on wettability.

Measurements of wettability of porous materials such as filter media are not trivial. The size and shape of the pores tend to deform droplets and hence the method of measuring contact angles does not work. Washburn describes a capillary rise method for liquid uptake in a porous medium that is a function of the wettability (surface energy) (Washburn E. W, "The dynamics of capillary flow", The American Physical Society, Vol. XVII, No. 3, 374-375, 1921).

Washburn's approach results in a measure of wettability through the Lipophilic/Hydrophilic Ratio (L/H). Small values of L/H indicate the surface prefers water to oil and visa versa for large L/H values.

Mixtures of glass fibers and polypropylene fibers show that we can control the L/H value by controlling the mixture composition of glass and polypropylene fibers when constructing a filter medium. FIG. 1 shows a plot of glass percentage versus L/H values.

The concept of mixing fibers of different surface properties to obtain a specific L/H value to control the coalescence properties of the filter medium is an important aspect of this invention.

An embodiment of the present invention relates to a process for removing an immiscible lipophilic or a hydrophilic liquid respectively from a continuous hydrophilic or a lipophilic liquid phase, comprising the steps of: 1) forming a filter comprising a specific weight ratio of hydrophobic fibers to hydrophilic fibers; 2) determining an initial slope of a weight gain take-up versus time plot of the immiscible liquid by said filter; 3) determining an initial slope of weight gain take-up versus time plot of said continuous liquid by said filter; 4) calculating an L/H ratio from said initial slope of the plot of said immiscible liquid and of said initial slope of the plot of said continuous liquid and obtaining a wettability value for each; 5) forming a plurality of filters comprising different weight ratios of said hydrophobic fibers to said hydrophilic fibers from a range of from about 90% by weight of said hydrophobic fibers to about 10% by weight, or any portion thereof, of hydrophobic fibers with the remaining weight percent being said hydrophilic fibers; repeating steps 2), 3), and 4) with respect to each weight ratio of said lipophobic fibers to said hydrophilic fibers in step 5); plotting a wettability range from said L/H wettability values obtained from said plurality of said different weight ratios of said hydrophobic fibers to said hydrophilic fibers; and utilizing a filter having a wetness value within a weight range of from about 20% to about 80% of hydrophobic fibers to hydrophilic fibers to coalesce said immiscible liquid phase within said continuous liquid phase.

Another embodiment of the present invention relates to a process for removing an immiscible lipophilic or a hydrophilic liquid respectively from a continuous hydrophilic or a lipophilic liquid phase, comprising the steps of: forming a filter containing hydrophobic fibers and hydrophilic fibers; flowing said immiscible lipophilic liquid or hydrophilic liquid respectively in said continuous liquid phase hydrophilic liquid or lipophilic liquid through said filter and capturing said immiscible liquid; coalescing said captured immiscible liquid; and removing said coalesced immiscible liquid from said filter.

Yet another embodiment of the present invention relates to a filter for removing an immiscible lipophilic liquid or a hydrophilic liquid respectively from a continuous hydrophilic liquid phase or a continuous lipophilic liquid phase, comprising: a plurality of hydrophobic fibers and a plurality of hydrophilic fibers, said hydrophilic fibers having a wetting value and said hydrophobic fibers having a different wetting value within a liquid system comprising the immiscible lipophilic liquid or the immiscible hydrophilic liquid and respectively the continuous hydrophilic liquid phase or the continuous lipophilic continuous liquid phase; the weight ratio amount of said hydrophobic fibers to said hydrophilic fibers being within a range of from about 80% to about 20% by weight with the remaining weight percent being said hydrophilic fibers and said fiber weight ratio amount being an effective amount to coalesce an immiscible liquid within a continuous liquid phase; and the filter being capable of removing an immiscible liquid from a continuous liquid phase.

BRIEF DESCRIPTION OF THE DRAWINGS

FIG. 3 is a diagram of an alternating layers of wetting and non-wetting fibers that are sandwiched together to form the filter wherein (a) the layers lie in a plane parallel to the large surface area of the filter, (b) the layers are perpendicular to the large surface of the filter, (c) the alternating layers are in a circular pattern. The layers may also be at some intermediate angle between parallel and perpendicular to the large surface (not shown in the drawing);

FIG. 4 is a diagram of a weight scale set up to determine the amount of take-up of the immiscible-continuous phase solution of the present invention;

FIG. 15 is a flow diagram for preparing a filter.

DETAILED DESCRIPTION OF THE INVENTION

Figure 1:
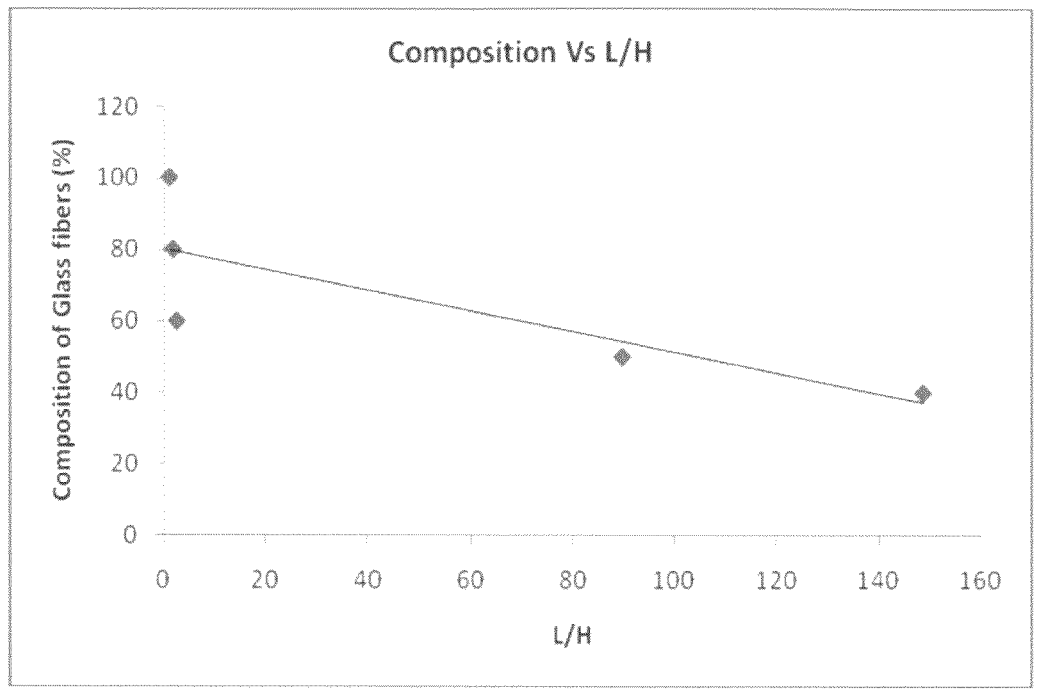
FIG. 1 is a diagram of an L/H value as a function of concentration (percentage) of glass fibers. The data show that changing the composition changes the L/H value giving a method to control the L/H value.
Figure 2:
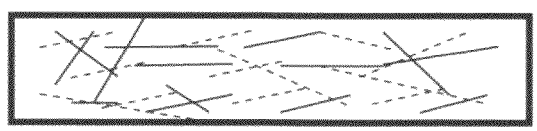
FIG. 2 is a diagram of a mixed fiber filter medium wherein one fiber type is represented by solid lines and the other by dashed lines. The fibers are generally randomly distributed.

The filters of the present invention can exist in many sizes, shapes and forms. The one or more hydrophobic fibers and the one or more hydrophilic fibers can generally either be mixed, or exist in separate layers. When mixed, the hydrophilic fibers and the hydrophobic-fiber types are blended so that within a small sample volume of the filter both types of fibers are present such as indicated in FIG. 2. In one embodiment a slurry of the fibers can be vacuum molded to form the filter. Non-woven filters typically have binders (glues) to hold the fiber structure together. Binders tend to stick to one type of fiber or the other. Being of similar chemical materials, the binders often have surface properties similar to the fibers that they stick to which aids in the construction of the filter and its wetting properties. The amounts of binders blended with the fibers are generally in proportion to the amount of each fiber type. Because the fibers are well blended, when the binders glue the fibers together the two types of binders generally become interlocked, forming a continuous filter medium structure. If one type of fiber is significantly more concentrated than the other then only the binder for the most concentrated fiber may be needed. The Washburn measurement as described herein below is conducted on the constructed filter and thus takes into account the presence of the binders.

An alternative method to make the filter with control over the L/H ratio is by utilizing thin layers of fibers of different types. This is shown in FIG. 3. As seen in FIG. 3a, a filter is made that has alternating layers of a hydrophobic fiber layer and a hydrophilic fiber layer. FIG. 3b relates to a filter wherein the layers exist perpendicular to a large surface area of the filter. In FIG. 3c, the filter has alternating layers are in a circular pattern. While not shown, an embodiment very similar to FIG. 3 can exist in that a spiral layers of an alternating hydrophobic layer and a hydrophilic layer can exist that commence at a center point and spiral radially outward and around the center point. The flow of the immiscible liquid contain in with the continuous phase liquid can either flow from top to bottom of FIG. 3a through the filter, or from end to end generally parallel form the various layers. While the flow can be the same with respect to the filter of FIG. 3b, the flow is generally perpendicular to the large surface of the filter, i.e. from top to bottom or vise-a-versa. The same is generally true with respect to the filter of FIG. 3c as well as the spiral filter arrangement.

Numerous types of hydrophobic fibers can be utilized so long as they are inert to the solution or gas they are treating. Hydrophobic fibers generally include polymers such as polyethylene, polypropylene, nomex, polyester such as polyethylene terephthalate, halogen-containing polymers such as Teflon and poly (vinyl chloride), various rubbers including natural rubber, polyisoprene, and polymers derived from butadiene, polyurethanes, polycarbonates, silicone polymers.

Hydrophobic fibers also include various minerals such as zinc oxide, for example zinc oxide nano-rods that are superhydrophobic, and the like. Still additional hydrophobic fibers include various fibers that contain coatings thereon such as various silanes such as (3-aminopropyltriethoxysilane) APTS, (2-carboxymethylthio)ethyltrimethylsilane) CES, and (heptadecafluoro-1,1,2,3-tetra-hydrodecyl)trichlorosilane FTS.

Examples of hydrophilic fibers include various types of glasses including sodium glass, boron glass, phosphate glass, B-glass and the like, various minerals such as alumina, titania, and silica, various metals such as aluminum and alloys thereof, various polymers such as cellulose acetate, poly(methylmethacrylate), polyethylene oxide, nylon, and the like. In general, polymers that absorb or swell with water are examples of hydrophilic polymers.

The hydrophobic fibers are generally distinguished from the hydrophilic fibers generally with regard to their wettability, that is, their ability to hold water. Various tests or methods can be utilized such as the contact angle of water located on a flat surface of the fiber composition. Contact angles less than about 90 degrees or less and generally 20 degrees or less are generally considered to be hydrophilic, whereas contact angles greater than about 90 degrees and generally at least about 120 degrees or greater are considered to be hydrophobic.

The one or more hydrophobic and the one or more hydrophilic fibers, of the present invention, independently, can have various thicknesses such as diameters as from about 0.1 to about 500 microns, desirably from about 0.5 to about 50 microns, and preferably from about 1 to about 10 microns. For this application the fiber diameters are generally about the same so that the pore sizes are about the same throughout the medium. Depending upon the type of fiber, they can generally have smooth surfaces or contain some pores. In general the internal pore structure affects the fiber wettability and is characterized by its contact angle and its performance is characterized by the L/H ratio. Because we are generally characterizing the L/H ratio the characterization of the internal pore structure of the fibers is not essential. It is an important aspect of the present invention that at least one hydrophobic fiber be utilized and that at least one hydrophilic fiber be utilized. That is, the present invention is free of any filters that essentially contain only one type of fiber such as only one hydrophobic-type fiber and no hydrophilic fiber or only one hydrophilic-type of fiber and no hydrophobic fiber. Thus, filters that essentially contain only one type of fiber are excluded from the present invention such as filters that contain small amounts of a second fiber, for exampled less than 5% by weight of a second philic fiber, for example a hydrophilic fiber, or less than about 3% by weight, or less than about 2% by weight, or no amount of a second different type of philic fiber. The reasoning is as set forth hereinabove as well as herein below that the utilization of at least one type of hydrophilic fiber and at least one type of hydrophobic fiber has been found to yield improved and efficient results with regard to removing an immiscible phase from a continuous phase liquid solution.

An important aspect of the present invention is the determination of the wettability value of the filter per se so that proper amounts of hydrophobic and hydrophilic fibers can be utilized that will result in efficient removal of the immiscible liquid or gas from the continuous liquid phase with low pressure drops since high pressure drops can result in expensive pumping cost. That is, high amounts of the immiscible fluids such as water in oil can result in high water saturation on the hydrophilic fibers that reduces porosity and permeability of the filter with the subsequent low porosity leading to excessive pressure drops. An additional disadvantage of high pressure is that high shearing forces within the filter can cause droplet breakup and re-entrainment. Also, high pressure drops result in large forces acting on the filter (pressure drop times filter area) and can cause the filter to collapse, deform, or loose integrity and hence render the filter useless. On the other hand, if the filter overall is too hydrophobic, there will be little or no coalescence of the immiscible fluid; the filter may capture solid particles but it would be ineffective for coalescing drops.

It has been found that traditional contact angles are not suitable for use in the present invention because liquid drops will simultaneously be in contact with multiple fibers, fiber types, and the binder (if present), all of which affect the contact angle. If the fibers are too small in diameter, the capillary action on the immiscible liquid will be affected and not yield a true contact angle. Instead, a liquid penetration approach is used to measure the contact angles of filter media treating the pores of the media as a bundle of uniform capillaries. This method of the liquid penetration is based on the equilibrium capillary pressure and Washburn's equation. Washburn's equation is based on the capillary driving force of a liquid that penetrates a compact vertical bed of particles with small pores and the viscous drag. However, a modified Washburn equation has been found to be suitable. The modified Washburn equation is:

$$\frac{L}{H} = \frac{S_o n_o c_w \rho_w^2 Y_w}{S_w n_w c_o \rho_o^2 Y_o} \quad \text{Equation 1}$$

Wherein $S_o$ is the initial weight gain take-up slope of the penetrated lipophilic fluid or liquid such as oil, $S_w$ is the initial weight gain take-up slope of the penetrated hydrophilic liquid, $n_o$ is the viscosity of the lipophilic liquid whereas $n_w$ is the viscosity of the hydrophilic fluid. $c_o$ and $c_w$ are the same for a filter medium where c is a geometric constant that accounts for the effective pore diameter and the porosity. When experiments are conducted on the same medium with the organic and water liquids then $c_w$ equals $c_o$ and cancel out of the equation whereas $\rho_w$ is the density of the hydrophilic liquid such as water, and $\rho_o$ is the density of the lipophilic liquid such as the oil. $Y_w$ is the surface tension of the hydrophilic liquid whereas the $Y_o$ is the surface tension of the lipophilic liquid. In order to find the L/H ratio, the slope and hence the amount of take-up of the lipophilic liquid and the hydrophobic liquid must be determined. One method is as follows:

Materials and Filter Media Preparation

The filter samples were made of glass fibers supplied by Hollingsworth and Vose and polypropylene fibers supplied by Minifibers Inc. The slurry of fibers with desired composition was vacuum filtered onto a fine mesh screen in a mold with a hole of inside diameter 2.54 cm. The filter samples were dried and heated in oven for 2 hrs at 100° C. The filter samples were prepared with varying compositions of glass to polypropylene (PP) fibers, i.e. glass: PP of 80:20, 60:40, 50:50, and 40:60. The reference fluids used were Viscor oil 1487 (Rock Valley Oil & Chemical Company) and water. The Viscor oil 1487 is a calibration fluid and has similar properties to that of diesel fuel. Physical properties of water and Viscor oil 1487 are presented in Table 1.

TABLE 1

Physical properties of reference fluids

| Reference Liquid | Surface Tension (N/m) | Density (Kg/m$^3$) | Viscosity |
|---|---|---|---|
| Viscor Oil 1487 | 0.0285 | 832 | 0.00207 (Ns/m$^2$) |
| Water | 0.072 | 998 | 0.001 (Ns/m$^2$) |

Wettability Technique and Approach

The setup for this work is illustrated in FIG. 4. Filters samples were characterized prior to wettability studies for their porosity and permeability. The porosity of the filter samples was measured using a special made pychnometer. The permeability was measured using a Frazier air permeability tester. The dimensions of filter sample were measured using calipers.

In FIG. 4, glass tube 1 was suspended from a wooden plank that is attached to scissors stand 6 which could be raised and lowered using adjustment screw 7. This tube had a tapered diameter which was the same as that of filter 2. Glass beaker 3 with reference liquid 4, with temperature maintained around 23°-25° was placed on the plate of electronic balance 5. A stop watch was placed in front of the electronic balance along with a video camera facing both balance and stop watch.

The tube was descended slowly with a low speed of 1.0 mm/sec. It was carefully done with several manual practices in order to get reproducible results. It was done with the extremity of the tube just touching the reference liquids. The video camera and stop watch were turned on when the filter medium touched the reference liquid to record the change in weight with time. The decline of the glass tube was ended and the liquid rose (penetrated) through the filter until it reached the top of the medium, causing an increase in weight of the cylinder. The video recording was stopped when liquid reached top of the filter medium.

The decrease in weight of the reference liquid on the balance is equal to the liquid taken by the filter media. The rate of decrease in weight of reference liquids on balance was measured until the liquid reached top of the filter. The experimental data was obtained from the recorded video. The weight of liquid raised in the filter media can be obtained for any instant of time until the liquid reaches the top of the filter.

Figure 5:
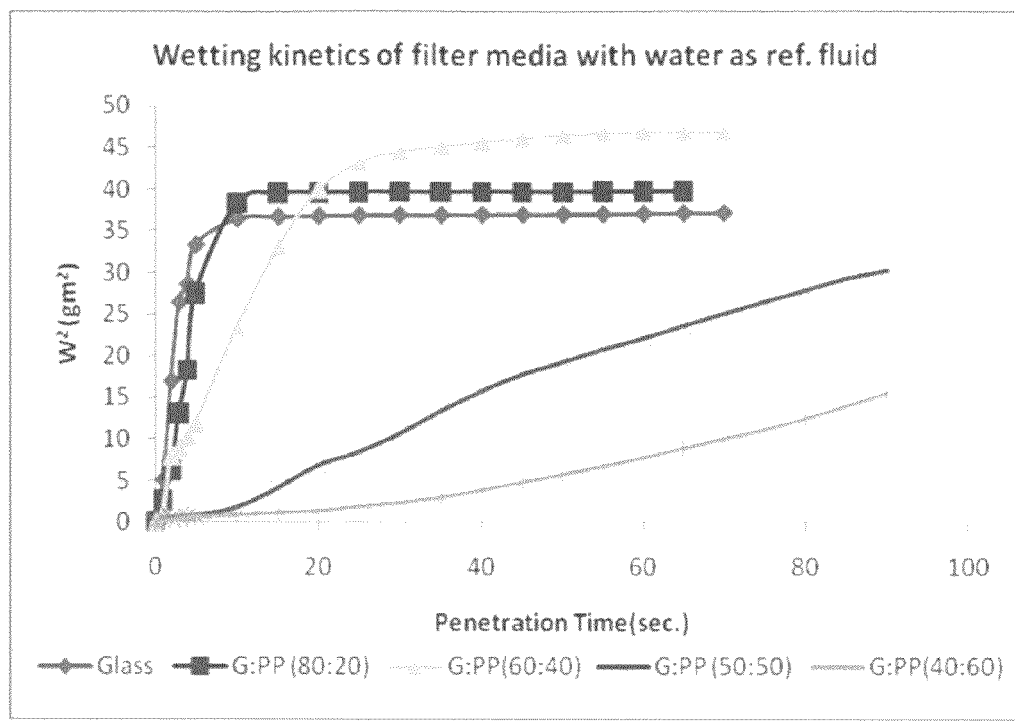
FIG. 5 is a graph showing the wetting kinetics for different glass and PP fiber ratios of a filter with water as the reference liquid.
Figure 6:
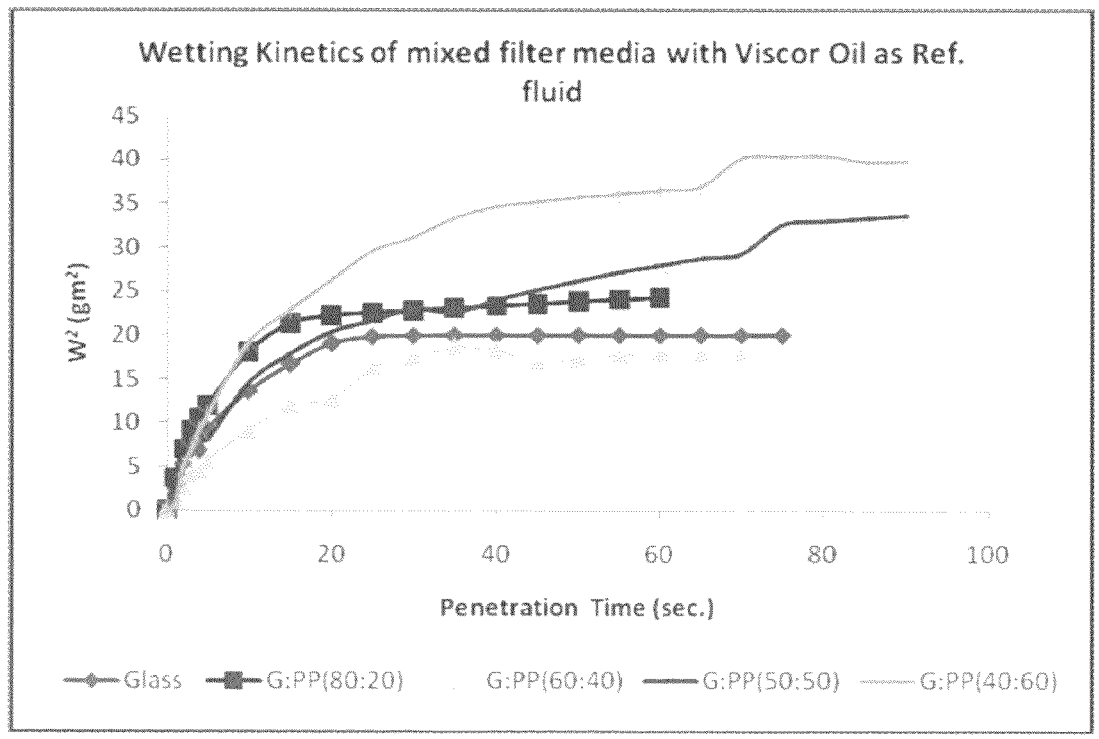
FIG. 6 is a graph showing wetting kinetics for different glass and PP fiber ratios of a filter with Viscor oil 1487 as a reference liquid.
Figure 11:
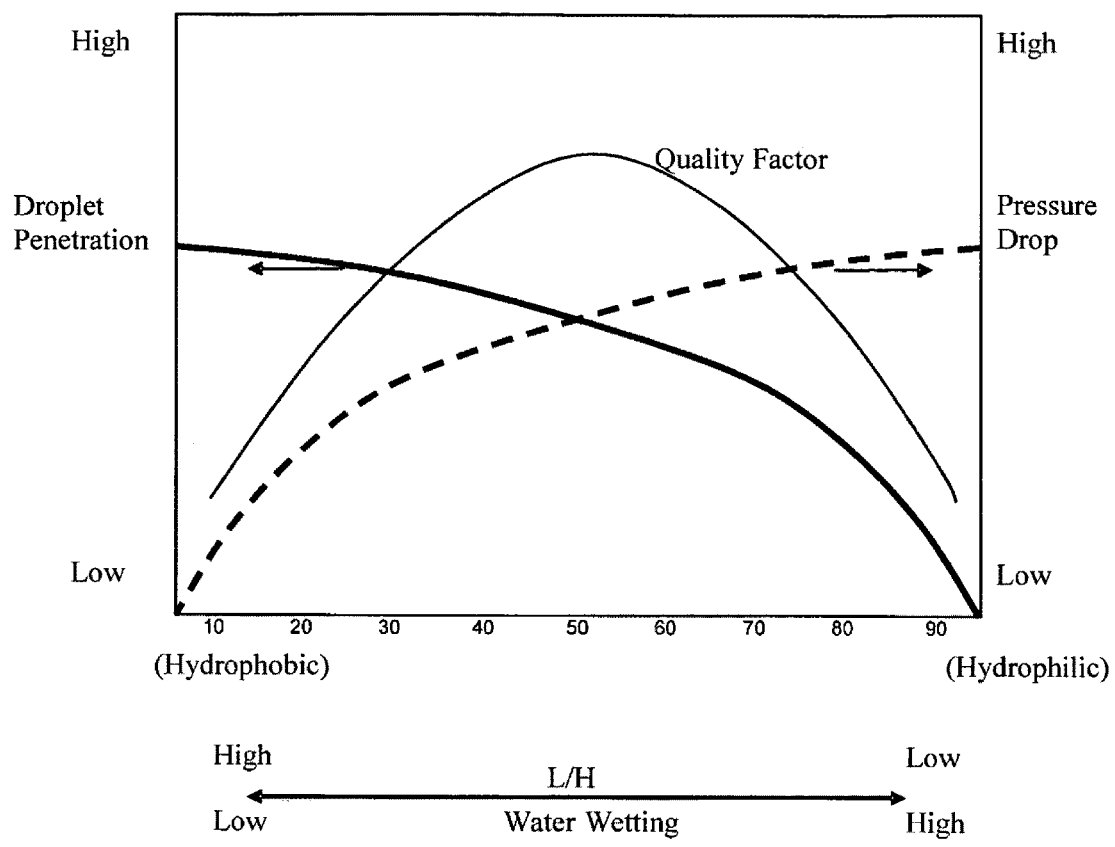
FIG. 11 is a graph showing droplet penetration and pressure drop with respect to wettability and L/H values.

Once the weight gain take-up of the filter has been determined with regard to the lipophilic fluid or liquid, such as an oil, and once it also has been obtained with regard to the hydrophilic liquid such as water, charts of the weight take-up versus time are plotted as shown in FIGS. 5 and 6. In order to obtain L/H ratio that represents a wettability value for a specific weight percent of the hydrophobic fiber and the remaining hydrophilic fiber, a plot is made of the initial take-up slope with regard to time, that is, within the first few seconds of take-up before the take-up curve flattens out. Thus, an initial slope $S_o$ is obtained with regard to the oil liquid and a slope $S_w$ is obtained with regard to the hydrophilic liquid such as water as set forth in FIGS. 7 and 8. These slope values are then inserted into equation 1 along with the other known values and a specific L/H value is obtained that is referred to as a wettability value with regard to specific amount of hydrophobic fiber and hydrophilic fiber in the filter. Subsequently, the same determination is made with regard to other amounts of hydrophobic fiber to hydrophilic fiber generally across a spectrum of possible weight combinations. For example, hydrophobic fibers to hydrophilic fibers of weight ratios of about 90% to about 10%, about 80% to about 20%, about 70% to about 30%, about 60% to about 40%, about 50% to about 50%, about 40% to about 60%, about 30% to about 70%, and about 20% to about 80%, or about 10% to about 90%; or any portion thereof can be utilized. Once the weight gain take-up has been obtained with regard to the additional weight ratios of hydrophilic fiber/hydrophobic fibers, and plotted against time, the initial weight gain slope is obtained and inserted into formula 1. These L/H values are inversely related to wettability values as shown in FIG. 11. The L/H values are then plotted against droplet penetration values where penetration is defined as the concentration of uncoalesced droplets carried out of the filter divided by the concentration of the incoming droplets. Hence, a high penetration means that most of the incoming droplets are unaffected (do not coalesce) and the low penetration means that most of the incoming droplets do coalesce. Measurement of droplet penetration is not standardized but there are methods to make the measurements that are common. For example, a particle counter (AccuSizer 780; PSS-NIComp Particle Sizing Systems, Santa Barbara, Calif.) was utilized to monitor particle sizes and concentrations in and out of the filter. However, because drops can coalesce and change size in the filter, the overall separation performance was utilized to determine the Quality Factor. This means the quality factor characterizes the performance of both the filter and the downstream separator (settling tank, hydrocyclone, etc.). The amount of the dispersed phase (water) entering the filter was controlled using a syringe pump. The amount of water separated from by the downstream separator was measured by decanting and weighing the amount of water that was separated. The outlet stream can further be sent to another downstream separator such as a settling tank and the amount of water not separated can be measured. The two outlet masses of water should sum to the inlet. The ratio of the mass-out/mass-in is equal to the ratio of the concentrations (by dividing by the same volume of continuous phase fluid) hence the penetration is calculated and plotted in FIG. 11 with respect to L/H values and generally relate to a slope that curves downwardly, (i.e. a negative slope) as the weight ratio of hydrophilic fibers to hydrophobic fibers increases.

Also plotted in FIG. 11 is the pressure drop of the immiscible liquid-continuous phase liquid system through the filter with different weight ratios of hydrophobic fiber to hydrophilic fiber. A curve is obtained that increases with increasing hydrophobic fiber ratios to hydrophilic fiber ratios inasmuch as the pressure drop increases with wettability. The combination of these two curves is given by the negative log of the penetration divided by the pressure drop and yields an inverse "U" curve or "quality factor" curve. This quality curve yields a good indication of a range of suitable hydrophobic to hydrophilic fiber weight ratios that can be utilized to obtain good extraction of the immiscible fluid a liquid from the immiscible liquid-continuous liquid phase solution and yet not obtain blocking of the filter or excessive pressure drop due to the build up of the immiscible fluid on the immiscible fluid loving type of fibers. Conversely, high ratios of hydrophobic fibers to hydrophilic fibers yield low pressure drops since there is no build up of water on the hydrophobic fibers. Permeability is determined by passing gas or liquid at a known flow rate and the pressure drop is measured. The permeability is then calculated from Darcy's Law. Accordingly, the filters of the present invention generally have a wettability range or a quality factor that lies within a hydrophobic fiber to hydrophilic fiber weight ratios from 20 percent to about 80 percent, desirably from about 30 percent to about 70 percent and preferably from about 35 percent to about 65 percent.

The above scenario will now be discussed with regard to a specific immiscible liquid, i.e. water and a continuous phase oil, as well as specific amounts of hydrophilic fibers such as glass and hydrophobic fibers such as polypropylene.

Figure 7:
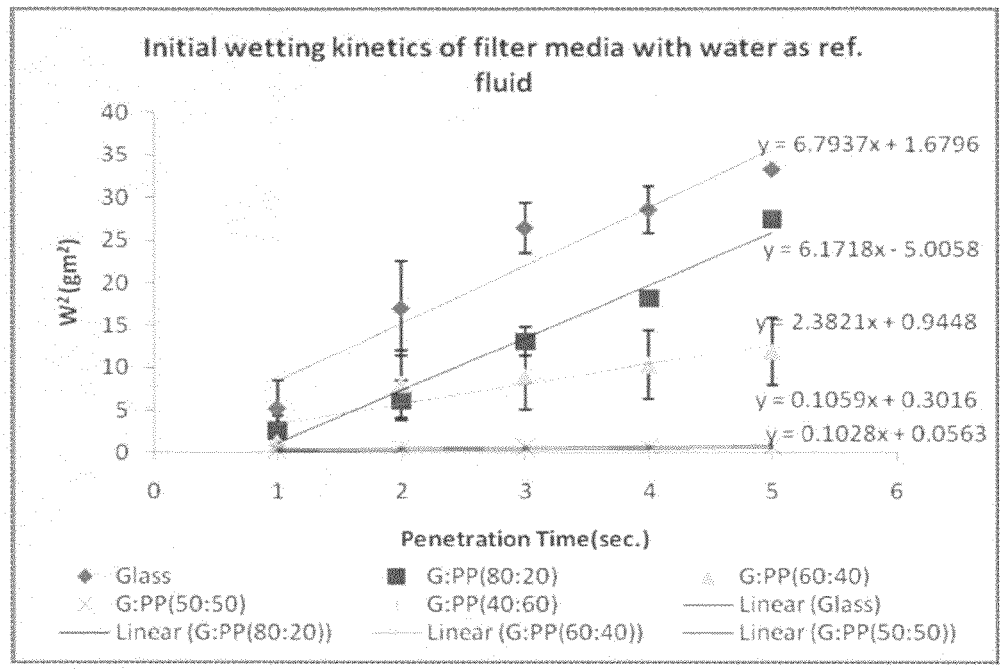
FIG. 7 is a graph showing initial wetting kinetics for different glass and PP fiber ratios of a filter with water as a reference liquid.
Figure 8:
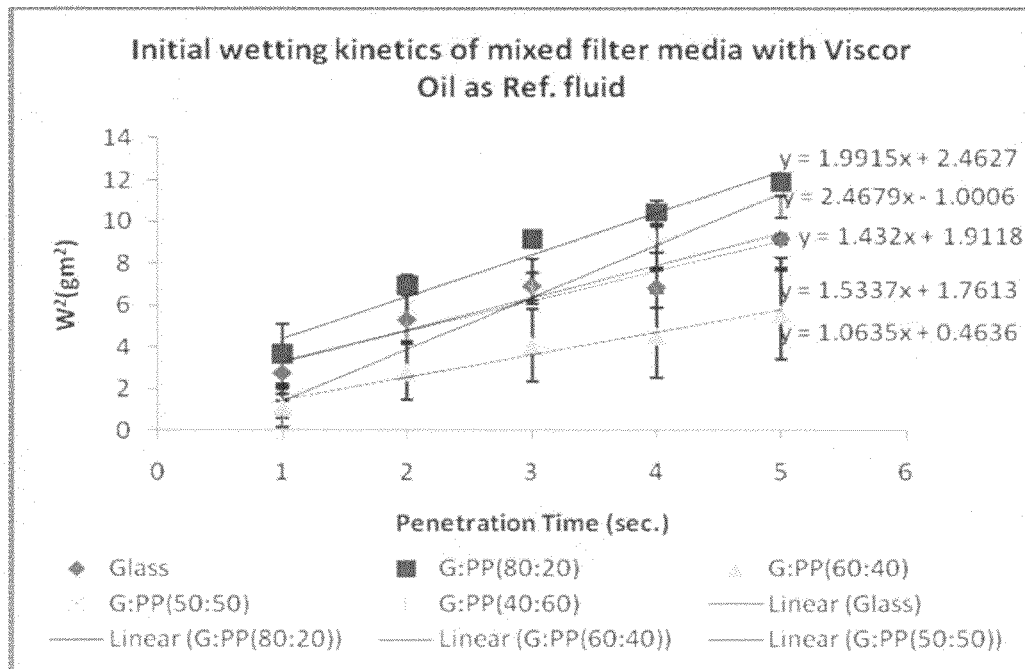
FIG. 8 is a graph showing initial wetting kinetics for different glass and PP fiber ratios of a filter with Viscor oil 1487 as a reference liquid.
Figure 9:
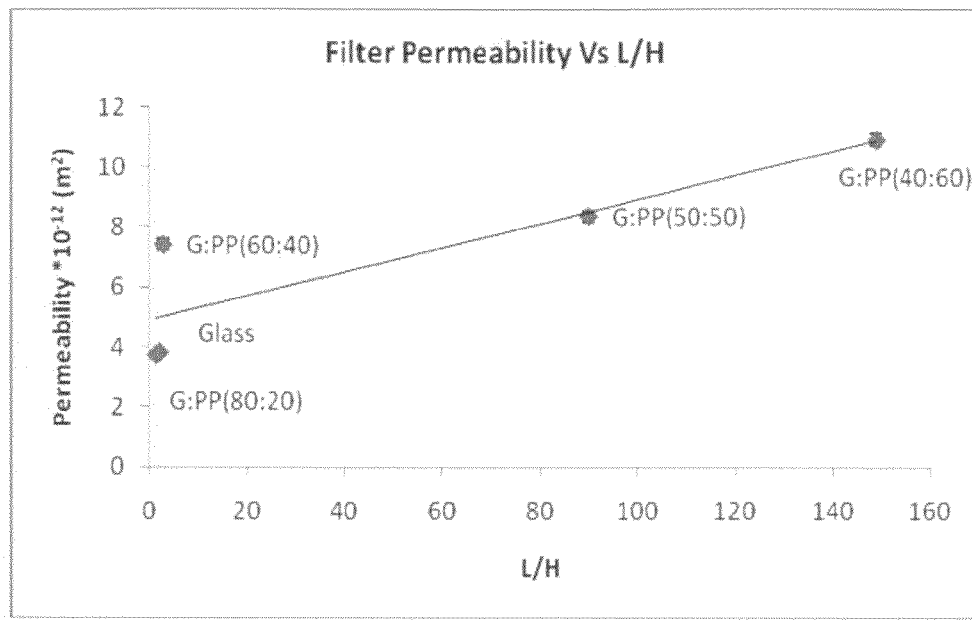
FIG. 9 is a graph showing filter permeability vs L/H values for different glass and PP fiber ratios of a filter.
Figure 10:
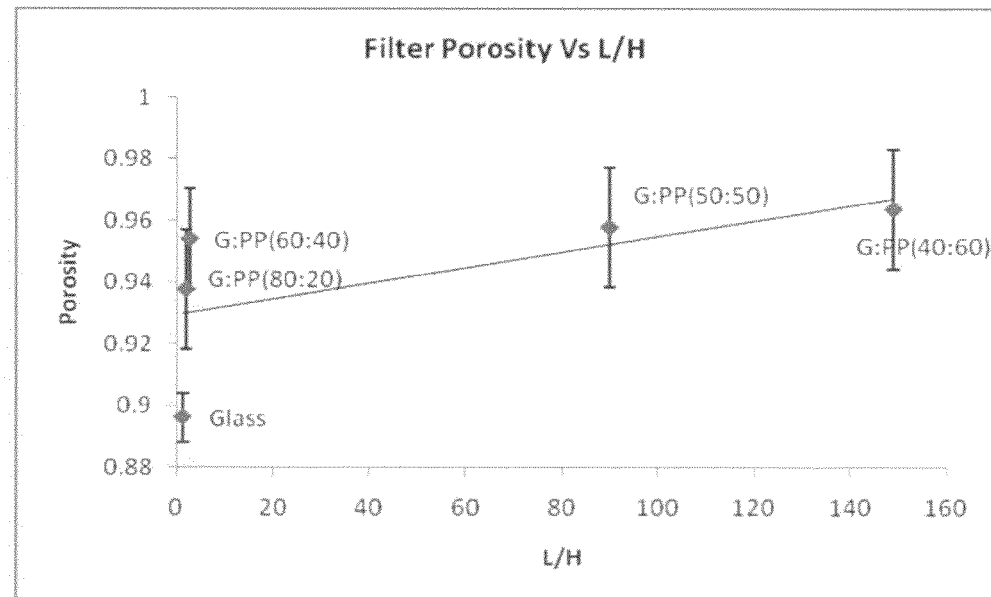
FIG. 10 is a graph showing L/H values vs filter porosity values for different glass and PP fiber ratios of a filter.

FIGS. 5 and 6 summarize some of the wetting kinetics results based on capillary rise respectively of water and Viscor oil 1487 for the filter media comprising varying compositions of micro glass and polypropylene fibers. FIGS. 7 and 8 show the initial wetting kinetics results for water and Viscor oil 1487. From these figures, the values of slopes So and $S_w$, are obtained and incorporated into equation 1 to calculate specific L/H wettability values. Smaller values of L/H indicate that filter media is preferentially water wetting and larger values of L/H indicate preferentially oil wetting filter media. It is noted that, as the amount of polypropylene fibers in filter media increases, the L/H value increases and that L/H values decrease with increasing amounts of glass fibers. The glass fiber only filter has the lowest L/H value. The effect of filter permeability and porosity on wettability of the filter is analyzed in FIGS. 9 and 10 respectively wherein permeability and porosity increase with additional polypropylene fibers in the filter as does the L/H values. Porosity can be determined using an air/water displacement experiment or by using a pycnometer. Suitable L/H ratios range from about 1 to about 3,000, generally from about 2 to about 2,000, desirably from about 2 to about 200, and preferably from about 2 or about 5 to about 150.

Once a specific lipophobic-hydrophilic system has been analyzed with regard to removal of an immiscible component thereof, other weight ratios of hydrophobic fibers to hydrophilic fiber systems can be analyzed in the same manner as set forth above to determine what types of hydrophobic fiber hydrophilic fiber system are the most efficient. That is, the above steps as for example set forth in FIGS. 4 through 8 can be repeated and the most efficient fiber ratio used for the filter. Filters can thus be designed that have different wetting properties due to different amounts of hydrophobic and hydrophilic fibers in filter. These filter media can be characterized by using the Modified Washburn equation and wettability can be represented in terms of a Lilophilic to Hydrophilic ratio. Thus, the results obtained from the above noted procedures are used to design a filter with optimum wettability range of wetting properties for the separation immiscible fluids from continuous phase liquids.

For example, Table 2 sets for L/H values obtained for layers of hydrophobic/hydrophilic fiber media such as those set forth above utilizing water and Viscor Oil 1487. That is, the various hydrophobic/hydrophilic fiber systems were made containing the fiber ratios as set forth in Table 2 and the L/H values calculated. For the above-noted immiscible water-continuous oil system, a ratio of 80% by weight of glass fibers to 20% by weight of propylene fibers yielded a value of 7.021. When tested, as set forth in Table 3, this ratio gave a good efficiency of water coalescence of 0.91 and a low pressure drop of 18.34 resulting in a quality factor or 0.132 that was very good. Table 4 relates to L/H values for glass fiber filters containing a binder thereon whereas Table 5 relates to L/H values for mixed (i.e. non layered) hydrophilic/hydrophobic fiber filters. Thus, utilizing the above procedures, different immiscible liquid-continuous liquid phase systems can be tested and filters designed to yield high amount of take up of the immiscible liquid with a fairly low amount of a pressure drop.

TABLE 2

L/H values for layered hydrophilic/hydrophobic fiber media

| Composition (Glass:PP) | L/H |
|---|---|
| G (100) | 1.830 |
| G:PP (80:20) | 7.021 |
| G:PP (60:40) | 8.652 |
| G:PP (50:50) | 17.438 |
| G:PP (40:60) | 22.879 |
| G:PP (20:80 | 36.981 |

TABLE 3

Liquid-liquid coalescence results

| Composition (Glass:PP) | L/H | Efficiency | Steady state Pressure Drop (kPa) | Quality Factor (kPa$^{-1}$) |
|---|---|---|---|---|
| 100% Glass (with binder) | 1.83 | 0.84 (±0.02) | 20.39 (±3.02) | 0.106 |
| G:PP (80:20) | 7.02 | 0.91 (±0.02) | 18.34 (±3.3) | 0.132 |

TABLE 4

L/H values for glass fiber filters showing effect of binder

| Composition (Glass:PP) | L/H |
|---|---|
| With Binder | 1.83 |
| Binder on outside edge | 1.26 |
| Without binder | 1.49 |

TABLE 5

L/H values of mixed hydrophilic/hydrophobic fiber filters

| Composition (Glass:PP) | L/H |
|---|---|
| Glass | 1.296 |
| G:PP (80:20) | 1.984 |
| G:PP (60:40) | 2.744 |
| G:PP (50:50) | 89.787 |
| G:PP (40:60) | 148.742 |

In summary, the above procedures of the present invention relate to the extraction of an immiscible liquid from a different continuous phase liquid in a filter essentially by three steps; that of capture, coalescence, and removal. As the liquid system moves through the filter, small droplets of an immiscible fluid such as water, attach and adhere to a hydrophilic fiber such as glass. Continued flow of the liquid system results in additional water build up on the hydrophilic fibers. That is, immiscible water is coalesced into larger droplets. Finally, a droplet size is reached such that it no longer adheres to the hydrophilic fiber due to the flow of the liquid system but detaches itself. The size of the large droplet will naturally vary with regard to the immiscible fluid be it a hydrophilic liquid such as water or hydrophobic liquid such as oil, and the wettability of the droplet on the hydrophilic fiber or hydrophobic fiber as the case may be. Generally such droplet sizes can range from about 5 to about 500 microns, and desirably within a range of from about 20 to about 100 microns. Removal of the large water droplets can be achieved by a number of methods, generally non-mechanical, such as collection of the large droplets in a gravity separator. Other collection methods include hydrocyclones, membrane separators, and absorbers. Thus, the present invention preferably is free of or does not utilize mechanism collection methods such as centrifuge, etc. Putting a coalescing filter upstream of these other devices can help the other devices to be more efficient, smaller in size, and less expensive to operate.

With regard to the coalescence filters of the present invention, other preparation factors include fluid velocity, fiber structure, fiber geometry, surface properties, fluid properties, and bed length (determines the filter efficiency). Liquid-liquid coalescence wettability of the fibers is also known to have effect on filter performance, especially when interfacial tension between phases is low. Wettability of fibers can be defined as ability of filter fibers to hold water. Wettability also depends on surface properties of fibers and porosity of the filter.

Figure 12:
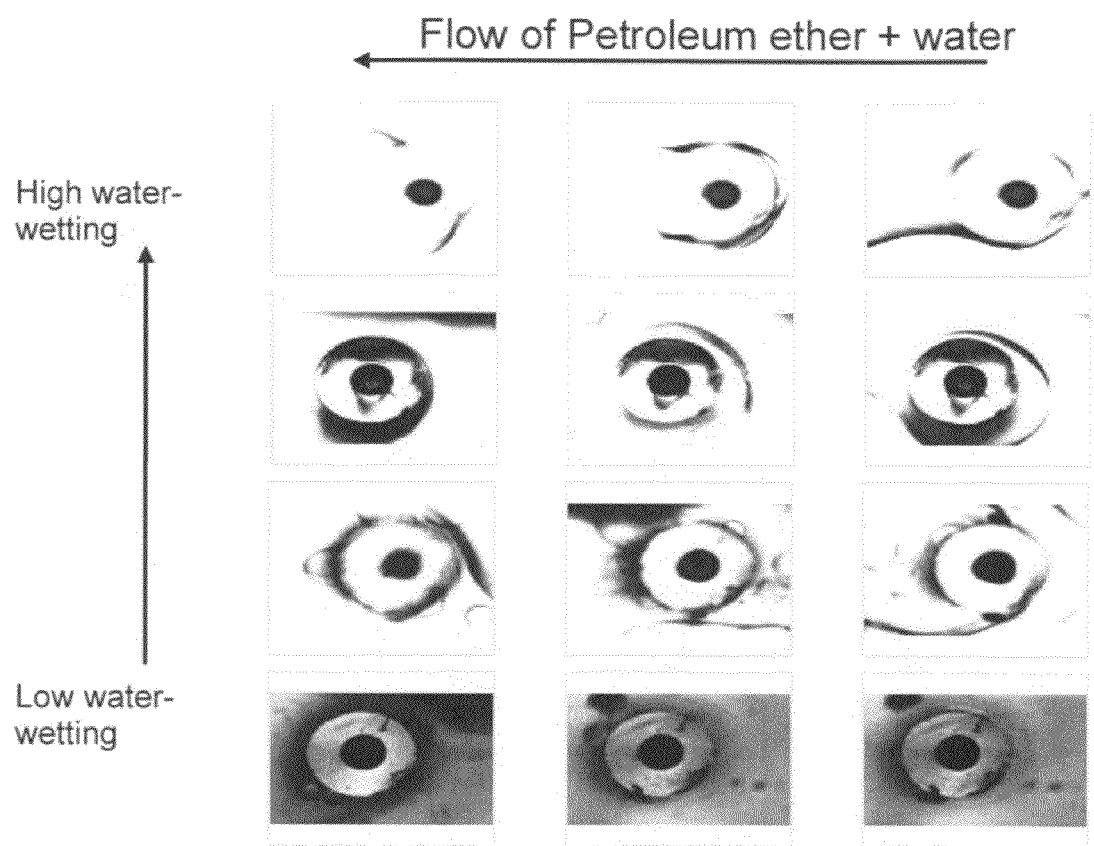
FIG. 12 are images showing the wettability of water on silane coated glass rods.

An optional aspect of the present invention is to utilize coating agents on the fibers such as silanes for making hydrophobic surfaces. FIG. 12 shows the effects of various different silanes coated on glass rods with regard to water wetting. The top row shows that untreated glass rods have high wetting. The second row from the top shows that moderate wetting is obtained whereas the third row from the top shows that only fair wetting is obtained whereas the bottom row shows that drops do not readily attach to the treated fiber and are quickly removed before a coalescence can occur.

As above noted, FIG. 11 relates to a chart that can be utilized to select ratios of hydrophobic and hydrophilic fibers to be utilized in making the coalescing filters of the present invention according to the above-noted procedures. The chart shows that at high hydrophilic fiber content the pressure drop is generally large and that at the large hydrophobic fiber content the L/H ratio is high. Thus, in order to obtain good removal of the immiscible liquid a water wetting content in the center portion of the wettability range is usually desired.

Figure 13:
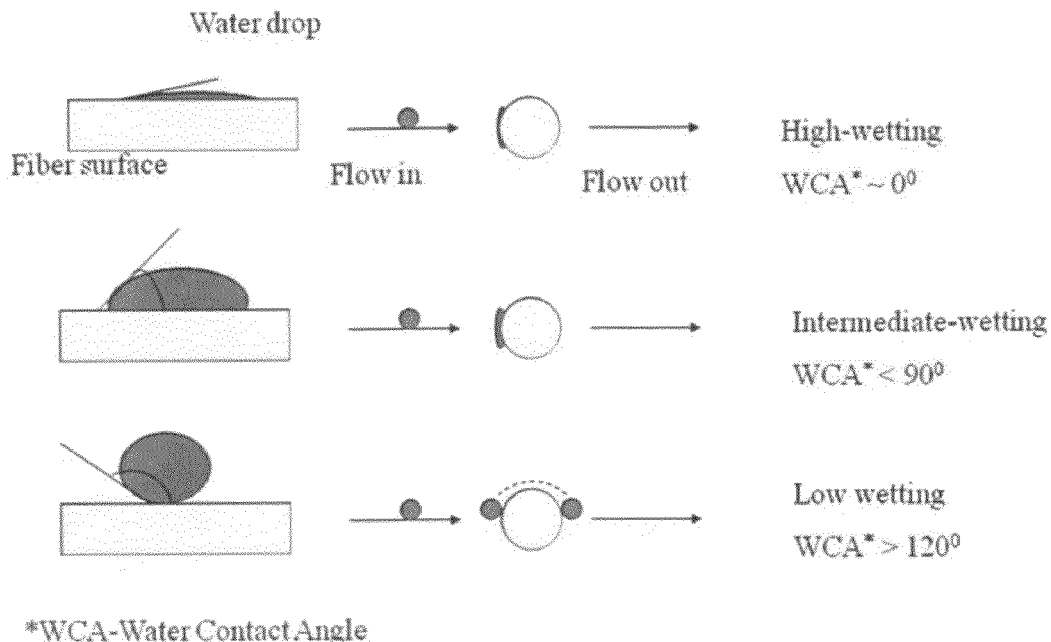
FIG. 13 is an illustration showing different water contact angles.

FIG. 13 is a diagram showing different contact angles with respect to high wetting, intermediate wetting, and low wetting as well as the coalescence of small droplets on the fiber. The top row relates to high wetting wherein the water contact angle is about 0°, the middle row relates to intermediate wetting wherein the water contact angel is less than about 90° and the bottom row relates to a low wetting wherein the water contact angle is high, i.e. above 120° C.

Figure 14:
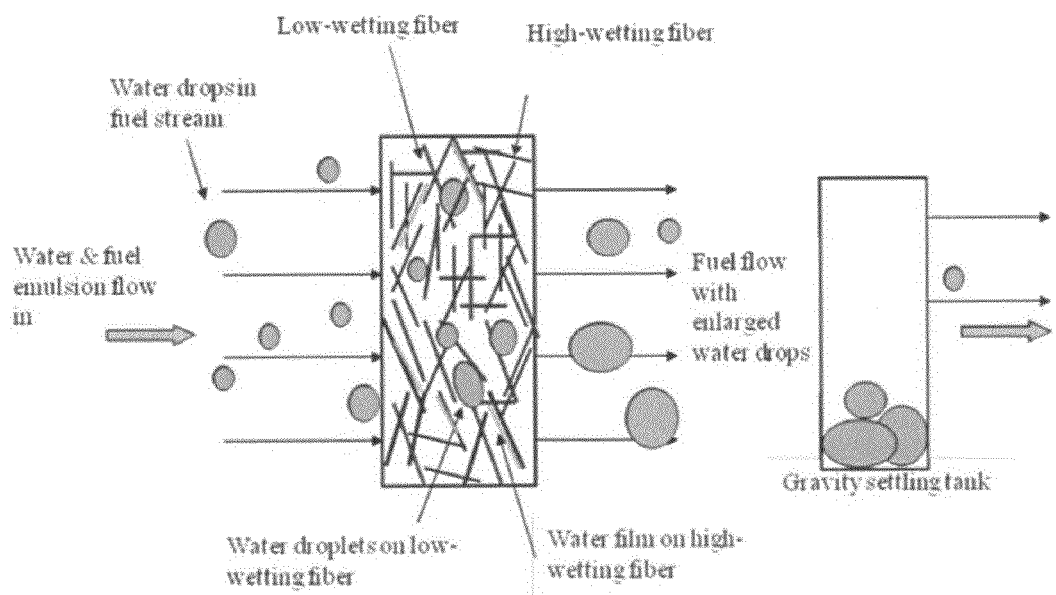
FIG. 14 is a flow diagram illustrating collecting immiscible water according to the present invention.

FIG. 14 relates to a hypothetical filter media design showing the droplets of immiscible fluid entering a filter, being captured on various fibers, coalescing, and then essentially dropping out a solution and being separated in a gravity settling tank.

Immiscible liquids include oil and water, produced water, fuels (diesel, gasoline, jet fuel) and water, Complete immiscibility is rare (some water is found in the oil phase and some oil in the water) but for the purposes of this patent it is sufficient that two or more distinctive liquid phases form. Perry's handbook (R. H Perry, D. W. Green, J. O. Maloney, Perry's Chemical Engineer's Handbook, $6^{th}$ ed, McGraw-Hill, NY 1984, pages 15-9 thru 15-13) a table of solvents used in liquid-liquid extraction gives an extensive list of two liquid phase systems (solvent A and solvent S). These tables are hereby fully incorporated by reference. However, they are also reproduced as Table 6.

TABLE 6

Selected List of Ternary Systems

| Component B | Component S | Temp., ° C. | $K_1$ | Ref. |
|---|---|---|---|---|
| A = cetane | | | | |
| Benzene | Aniline | 25 | 1.290 | 47 |
| n-Heptane | Aniline | 25 | 0.0784 | 47 |
| A = cottonseed oil | | | | |
| Oleic acid | Propane | 85 | 0.150 | 46 |
| A = cyclohexane | | 98.5 | 0.1272 | 46 |
| Benzene | Furfural | 25 | 0.680 | 44 |
| Benzene | Nitromethane | 25 | 0.397 | 127 |
| A = docosane | | | | |
| 1,6-Diphenylhexane | Furfural | 45 | 0.980 | 11 |
| | | 80 | 1.100 | 11 |
| | | 115 | 1.062 | 11 |
| A = dodecane | | | | |
| Methylnaphthalene | β,β'-Iminodipropionitrile | ca. 25 | 0.625 | 92 |
| Methylnaphthalene | β,β'-Oxydipropionitrile | ca. 25 | 0.377 | 92 |
| A = ethylbenzene | | | | |
| Styrene | Ethylene glycol | 25 | 0.190 | 10 |
| A = ethylene glycol | | | | |
| Acetone | Amyl acetate | 31 | 1.838 | 86 |
| Acetone | n-Butyl acetate | 31 | 1.940 | 86 |
| Acetone | Cyclohexane | 27 | 0.508 | 86 |
| Acetone | Ethyl acetate | 31 | 1.850 | 86 |
| Acetone | Ethyl butyrate | 31 | 1.903 | 86 |
| Acetone | Ethyl propionate | 31 | 2.32 | 86 |
| A = furfural | | | | |
| Trilinolein | n-Heptane | 30 | 47.5 | 15 |
| | | 50 | 21.4 | 15 |
| | | 70 | 19.5 | 15 |

TABLE 6-continued

Selected List of Ternary Systems

| Component B | Component S | Temp., °C. | $K_1$ | Ref. |
|---|---|---|---|---|
| Triolein | n-Heptane | 30 | 95 | 15 |
|  |  | 50 | 108 | 15 |
|  |  | 70 | 41.5 | 15 |
| A = glycerol |  |  |  |  |
| Ethanol | Benzene | 25 | 0.159 | 62 |
| Ethanol | Carbon tetrachloride | 25 | 0.0667 | 63 |
| A = n-heptane |  |  |  |  |
| Benzene | Ethylene glycol | 25 | 0.300 | 50 |
|  |  | 125 | 0.316 | 50 |
| Benzene | β,β'-thiodipropionitrile | 25 | 0.350 | 92 |
| Benzene | Triethylene glycol | 25 | 0.351 | 89 |
| Cyclohexane | Aniline | 25 | 0.0815 | 47 |
| Cyclohexane | Benzyl alcohol | 0 | 0.107 | 29 |
|  |  | 15 | 0.267 | 29 |
| Cyclohexane | Dimethylformamide | 20 | 0.1320 | 28 |
| Cyclohexane | Furfural | 30 | 0.0635 | 78 |
| Ethylbenzene | Dipropylene glycol | 25 | 0.329 | 90 |
| Ethylbenzene | β,β'-Oxydipropionitrile | 25 | 0.180 | 101 |
| Ethylbenzene | β,β'-Thiodipropionitrile | 25 | 0.100 | 101 |
| Ethylbenzene | Triethylene glycol | 25 | 0.140 | 89 |
| Methylcyclohexane | Aniline | 25 | 0.087 | 116 |
| Toluene | Aniline | 0 | 0.577 | 27 |
|  |  | 13 | 0.477 | 27 |
|  |  | 20 | 0.457 | 27 |
|  |  | 40 | 0.425 | 27 |
| Toluene | Benzyl alcohol | 0 | 0.694 | 29 |
| Toluene | Dimethylformamide | 0 | 0.667 | 28 |
|  |  | 20 | 0.514 | 28 |
| Toluene | Dipropylene glycol | 25 | 0.331 | 90 |
| Toluene | Ethylene glycol | 25 | 0.150 | 101 |
| Toluene | Propylene carbonate | 20 | 0.732 | 39 |
| Toluene | β,β'-Thiodipropionitrile | 25 | 0.150 | 101 |
| Toluene | Triethylene glycol | 25 | 0.289 | 89 |
| m-Xylene | β,β'-Thiodipropionitrile | 25 | 0.050 | 101 |
| o-Xylene | β,β'-Thiodipropionitrile | 25 | 0.150 | 101 |
| p-Xylene | β,β'-Thiodipropionitrile | 25 | 0.080 | 101 |
| A = n-hexane |  |  |  |  |
| Benzene | Ethylenediamine | 20 | 4.14 | 23 |
| A = neo-hexane |  |  |  |  |
| Cyclopentane | Aniline | 15 | 0.1259 | 96 |
|  |  | 25 | 0.311 | 96 |
| A = methylcyclohexane |  |  |  |  |
| Toluene | Methylperfluorooctanoate | 10 | 0.1297 | 58 |
|  |  | 25 | 0.200 | 58 |
| A = iso-octane |  |  |  |  |
| Benzene | Furfural | 25 | 0.833 | 44 |
| Cyclohexane | Furfural | 25 | 0.1076 | 44 |
| n-Hexane | Furfural | 30 | 0.083 | 78 |
| A = perfluoroheptane |  |  |  |  |
| Perfluorocyclic oxide | Carbon tetrachloride | 30 | 0.1370 | 58 |
| Perfluorocyclic oxide | n-Heptane | 30 | 0.329 | 58 |
| A = perfluoro-n-hexane |  |  |  |  |
| n-Hexane | Benzene | 30 | 6.22 | 80 |
| n-Hexane | Carbon disulfide | 25 | 6.50 | 80 |
| A = perfluorotri-n-butylamine |  |  |  |  |
| Iso-octane | Nitroethane | 25 | 3.59 | 119 |
|  |  | 31.5 | 2.36 | 119 |
|  |  | 33.7 | 4.56 | 119 |
| A = toluene |  |  |  |  |
| Acetone | Ethylene glycol | 0 | 0.286 | 100 |
|  |  | 24 | 0.326 | 100 |
| A = triethylene glycol |  |  |  |  |
| α-Picoline | Methylcyclohexane | 20 | 3.87 | 14 |
| α-Picoline | Diisobutylene | 20 | 0.445 | 14 |
| α-Picoline | Mixed heptanes | 20 | 0.317 | 14 |

TABLE 6-continued

Selected List of Ternary Systems

| Component B | Component S | Temp., °C. | $K_1$ | Ref. |
|---|---|---|---|---|
| A = triolein | | | | |
| Oleic acid | Propane | 85 | 0.138 | 46 |
| A = water | | | | |
| Acetaldehyde | n-Amyl alcohol | 18 | 1.43 | 74 |
| Acetaldehyde | Benzene | 18 | 1.119 | 74 |
| Acetaldehyde | Furfural | 16 | 0.967 | 74 |
| Acetaldehyde | Toluene | 17 | 0.478 | 74 |
| Acetaldehyde | Vinyl acetate | 20 | 0.560 | 81 |
| Acetic acid | Benzene | 25 | 0.0328 | 43 |
| | | 30 | 0.0984 | 38 |
| | | 40 | 0.1022 | 38 |
| | | 50 | 0.0558 | 38 |
| | | 60 | 0.0637 | 38 |
| Acetic acid | 1-Butanol | 26.7 | 1.613 | 102 |
| Acetic acid | Butyl acetate | 30 | 0.705 | 45 |
| | | | 0.391 | 67 |
| Acetic acid | Caproic acid | 25 | 0.349 | 73 |
| Acetic acid | Carbon tetrachloride | 27 | 0.1920 | 91 |
| | | 27.5 | 0.0549 | 54 |
| Acetic acid | Chloroform | ca. 25 | 0.178 | 70 |
| | | 25 | 0.0865 | 72 |
| | | 56.8 | 0.1573 | 17 |
| Acetic acid | Creosote oil | 34 | 0.706 | 91 |
| Acetic acid | Cyclohexanol | 26.7 | 1.325 | 102 |
| Acetic acid | Diisobutyl ketone | 25-26 | 0.284 | 75 |
| Acetic acid | Di-n-butyl ketone | 25-26 | 0.379 | 75 |
| Acetic acid | Diisopropyl carbinol | 25-26 | 0.800 | 75 |
| Acetic acid | Ethyl acetate | 30 | 0.907 | 30 |
| Acetic acid | 2-Ethylbutyric acid | 25 | 0.323 | 73 |
| Acetic acid | 2-Ethylhexoic acid | 25 | 0.286 | 73 |
| Acetic acid | Ethylidene diacetate | 25 | 0.85 | 104 |
| Acetic acid | Ethyl propionate | 28 | 0.510 | 87 |
| Acetic acid | Fenchone | 25-26 | 0.310 | 75 |
| Acetic acid | Furfural | 26.7 | 0.787 | 102 |
| Acetic acid | Heptadecanol | 25 | 0.312 | 114 |
| | | 50 | 0.1623 | 114 |
| Acetic acid | 3-Heptanol | 25 | 0.828 | 76 |
| Acetic acid | Hexalin acetate | 25-26 | 0.520 | 75 |
| Acetic acid | Hexane | 31 | 0.0167 | 85 |
| Acetic acid | Isoamyl acetate | 25-26 | 0.343 | 75 |
| Acetic acid | Isophorone | 25-26 | 0.858 | 75 |
| Acetic acid | Isopropyl ether | 20 | 0.248 | 31 |
| | | 25-26 | 0.429 | 75 |
| Acetic acid | Methyl acetate | — | 1.273 | 67 |
| Acetic acid | Methyl butyrate | 30 | 0.690 | 66 |
| Acetic acid | Methyl cyclohexanone | 25-26 | 0.930 | 75 |
| Acetic acid | Methylisobutyl carbinol | 30 | 1.058 | 83 |
| Acetic acid | Methylisobutyl ketone | 25 | 0.657 | 97 |
| | | 25-26 | 0.755 | 75 |
| Acetic acid | Monochlorobenzene | 25 | 0.0435 | 77 |
| Acetic acid | Octyl acetate | 25-26 | 0.1805 | 75 |
| Acetic acid | n-Propyl acetate | — | 0.638 | 67 |
| Acetic acid | Toluene | 25 | 0.0644 | 131 |
| Acetic acid | Trichloroethylene | 27 | 0.140 | 91 |
| | | 30 | 0.0549 | 54 |
| Acetic acid | Vinyl acetate | 28 | 0.294 | 103 |
| Acetone | Amyl acetate | 30 | 1.228 | 117 |
| Acetone | Benzene | 15 | 0.940 | 11 |
| | | 30 | 0.862 | 11 |
| | | 45 | 0.725 | 11 |
| Acetone | n-Butyl acetate | — | 1.127 | 67 |
| Acetone | Carbon tetrachloride | 30 | 0.238 | 12 |
| Acetone | Chloroform | 25 | 1.830 | 43 |
| | | 25 | 1.720 | 3 |
| Acetone | Dibutyl ether | 25-26 | 1.941 | 75 |
| Acetone | Diethyl ether | 30 | 1.00 | 54 |
| Acetone | Ethyl acetate | 30 | 1.500 | 117 |
| Acetone | Ethyl butyrate | 30 | 1.278 | 117 |
| Acetone | Ethyl propionate | 30 | 1.385 | 117 |
| Acetone | n-Heptane | 25 | 0.274 | 112 |
| Acetone | n-Hexane | 25 | 0.343 | 114 |
| Acetone | Methyl acetate | 30 | 1.153 | 117 |
| Acetone | Methylisobutyl ketone | 25-26 | 1.910 | 75 |
| Acetone | Monochlorobenzene | 25-26 | 1.000 | 75 |

TABLE 6-continued

Selected List of Ternary Systems

| Component B | Component S | Temp., °C. | $K_1$ | Ref. |
|---|---|---|---|---|
| Acetone | Propyl acetate | 30 | 0.243 | 117 |
| Acetone | Tetrachloroethane | 25-26 | 2.37 | 57 |
| Acetone | Tetrachloroethylene | 30 | 0.237 | 88 |
| Acetone | 1,1,2-Trichloroethane | 25 | 1.467 | 113 |
| Acetone | Toluene | 25-26 | 0.835 | 75 |
| Acetone | Vinyl acetate | 20 | 1.237 | 81 |
|  |  | 25 | 3.63 | 104 |
| Acetone | Xylene | 25-26 | 0.659 | 75 |
| Allyl alcohol | Diallyl ether | 22 | 0.572 | 32 |
| Aniline | Benzene | 25 | 14.40 | 40 |
|  |  | 50 | 15.50 | 40 |
| Aniline | n-Heptane | 25 | 1.425 | 40 |
|  |  | 50 | 2.20 | 40 |
| Aniline | Methylcyclohexane | 25 | 2.05 | 40 |
|  |  | 50 | 3.41 | 40 |
| Aniline | Nitrobenzene | 25 | 18.89 | 108 |
| Aniline | Toluene | 25 | 12.91 | 107 |
| Aniline hydrochloride | Aniline | 25 | 0.0540 | 98 |
| Benzoic acid | Methylisobutyl ketone | 26.7 | 76.9* | 49 |
| iso-Butanol | Benzene | 25 | 0.989 | 1 |
| iso-Butanol | 1,1,2,2-Tetrachloroethane | 25 | 1.80 | 36 |
| iso-Butanol | Tetrachloroethylene | 25 | 0.0460 | 7 |
| n-Butanol | Benzene | 25 | 1.263 | 126 |
|  |  | 35 | 2.12 | 126 |
| n-Butanol | Toluene | 30 | 1.176 | 37 |
| tert-Butanol | Benzene | 25 | 0.401 | 99 |
| tert-Butanol | tert-Butyl hypochlorite | 0 | 0.1393 | 130 |
|  |  | 20 | 0.1487 | 130 |
|  |  | 40 | 0.200 | 129 |
|  |  | 60 | 0.539 | 129 |
| tert-Butanol | Ethyl acetate | 20 | 1.74 | 5 |
| 2-Butoxyethanol | Methylethyl ketone | 25 | 3.05 | 68 |
| 2,3-Butylene glycol | n-Butanol | 26 | 0.597 | 71 |
|  |  | 50 | 0.893 | 71 |
| 2,3-Butylene glycol | Butyl acetate | 26 | 0.0222 | 71 |
|  |  | 50 | 0.0326 | 71 |
| 2,3-Butylene glycol | Butylene glycol diacetate | 26 | 0.1328 | 71 |
|  |  | 75 | 0.565 | 71 |
| 2,3-Butylene glycol | Methylvinyl carbinol acetate | 26 | 0.237 | 71 |
|  |  | 50 | 0.351 | 71 |
|  |  | 75 | 0.247 | 71 |
| n-Butylamine | Monochlorobenzene | 25 | 1.391 | 77 |
| 1-Butyraldehyde | Ethyl acetate | 37.8 | 41.3 | 52 |
| Butyric acid | Methyl butyrate | 30 | 6.75 | 66 |
| Butyric acid | Methylisobutyl carbinol | 30 | 12.12 | 83 |
| Cobaltous chloride | Dioxane | 25 | 0.0052 | 93 |
| Cupric sulfate | n-Butanol | 30 | 0.000501 | 9 |
| Cupric sulfate | sec-Butanol | 30 | 0.00702 | 9 |
| Cupric sulfate | Mixed pentanols | 30 | 0.000225 | 9 |
| p-Cresol | Methylnaphthalene | 35 | 9.89 | 82 |
| Diacetone alcohol | Ethylbenzene | 25 | 0.335 | 22 |
| Diacetone alcohol | Styrene | 25 | 0.445 | 22 |
| Dichloroacetic acid | Monochlorobenzene | 25 | 0.0690 | 77 |
| 1,4-Dioxane | Benzene | 25 | 1.020 | 8 |
| Ethanol | n-Amyl alcohol | 25-26 | 0.598 | 75 |
| Ethanol | Benzene | 25 | 0.1191 | 13 |
|  |  | 25 | 0.0536 | 115 |
| Ethanol | n-Butanol | 20 | 3.00 | 26 |
| Ethanol | Cyclohexane | 25 | 0.0157 | 118 |
| Ethanol | Cyclohexene | 25 | 0.0244 | 124 |
| Ethanol | Dibutyl ether | 25-26 | 0.1458 | 75 |
| Ethanol | Di-n-propyl ketone | 25-26 | 0.592 | 75 |
| Ethanol | Ethyl acetate | 0 | 0.0263 | 5 |
|  |  | 20 | 0.500 | 5 |
|  |  | 70 | 0.455 | 41 |
| Ethanol | Ethyl isovalerate | 25 | 0.392 | 13 |
| Ethanol | Heptadecanol | 25 | 0.270 | 114 |
| Ethanol | n-Heptane | 30 | 0.274 | 94 |
| Ethanol | 3-Heptanol | 25 | 0.783 | 76 |
| Ethanol | n-Hexane | 25 | 0.00212 | 111 |
| Ethanol | n-Hexanol | 28 | 1.00 | 56 |
| Ethanol | sec-Octanol | 28 | 0.825 | 56 |
| Ethanol | Toluene | 25 | 0.01816 | 122 |
| Ethanol | Trichloroethylene | 25 | 0.0682 | 16 |
| Ethylene glycol | n-Amyl alcohol | 20 | 0.1159 | 59 |
| Ethylene glycol | n-Butanol | 27 | 0.412 | 85 |

TABLE 6-continued

Selected List of Ternary Systems

| Component B | Component S | Temp., °C. | $K_1$ | Ref. |
|---|---|---|---|---|
| Ethylene glycol | Furfural | 25 | 0.315 | 18 |
| Ethylene glycol | n-Hexanol | 20 | 0.275 | 59 |
| Ethylene glycol | Methylethyl ketone | 30 | 0.0527 | 85 |
| Formic acid | Chloroform | 25 | 0.00445 | 72 |
|  |  | 56.9 | 0.0192 | 17 |
| Formic acid | Methylisobutyl carbinol | 30 | 1.218 | 83 |
| Furfural | n-Butane | 51.5 | 0.712 | 42 |
|  |  | 79.5 | 0.930 | 42 |
| Furfural | Methylisobutyl ketone | 25 | 7.10 | 19 |
| Furfural | Toluene | 25 | 5.64 | 53 |
| Hydrogen chloride | iso-Amyl alcohol | 25 | 0.170 | 21 |
| Hydrogen chloride | 2,6-Dimethyl-4-heptanol | 25 | 0.266 | 21 |
| Hydrogen chloride | 2-Ethyl-1-butanol | 25 | 0.534 | 21 |
| Hydrogen chloride | Ethylbutyl ketone | 25 | 0.01515 | 79 |
| Hydrogen chloride | 3-Heptanol | 25 | 0.0250 | 21 |
| Hydrogen chloride | 1-Hexanol | 25 | 0.345 | 21 |
| Hydrogen chloride | 2-Methyl-1-butanol | 25 | 0.470 | 21 |
| Hydrogen chloride | Methylisobutyl ketone | 25 | 0.0273 | 79 |
| Hydrogen chloride | 2-Methyl-1-pentanol | 25 | 0.502 | 21 |
| Hydrogen chloride | 2-Methyl-2-pentanol | 25 | 0.411 | 21 |
| Hydrogen chloride | Methylisopropyl ketone | 25 | 0.0814 | 79 |
| Hydrogen chloride | 1-Octanol | 25 | 0.424 | 21 |
| Hydrogen chloride | 2-Octanol | 25 | 0.380 | 21 |
| Hydrogen chloride | 1-Pentanol | 25 | 0.257 | 21 |
| Hydrogen chloride | Pentanols (mixed) | 25 | 0.271 | 21 |
| Hydrogen fluoride | Methylisobutyl ketone | 25 | 0.370 | 79 |
| Lactic acid | iso-Amyl alcohol | 25 | 0.352 | 128 |
| Methanol | Benzene | 25 | 0.01022 | 4 |
| Methanol | n-Butanol | 0 | 0.600 | 65 |
|  |  | 15 | 0.479 | 65 |
|  |  | 30 | 0.510 | 65 |
|  |  | 45 | 1.260 | 65 |
|  |  | 60 | 0.682 | 65 |
| Methanol | p-Cresol | 35 | 0.313 | 82 |
| Methanol | Cyclohexane | 25 | 0.0156 | 125 |
| Methanol | Cyclohexene | 25 | 0.01043 | 124 |
| Methanol | Ethyl acetate | 0 | 0.0589 | 5 |
|  |  | 20 | 0.238 | 5 |
| Methanol | n-Hexanol | 28 | 0.565 | 55 |
| Methanol | Methylnaphthalene | 25 | 0.025 | 82 |
|  |  | 35 | 0.0223 | 82 |
| Methanol | sec-Octanol | 28 | 0.584 | 55 |
| Methanol | Phenol | 25 | 1.333 | 82 |
| Methanol | Toluene | 25 | 0.0099 | 60 |
| Methanol | Trichloroethylene | 27.5 | 0.0167 | 54 |
| Methyl-n-butyl ketone | n-Butanol | 37.8 | 53.4 | 52 |
| Methylethyl ketone | Cyclohexane | 25 | 1.775 | 48 |
|  |  | 30 | 3.60 | 85 |
| Methylethyl ketone | Gasoline | 25 | 1.686 | 64 |
| Methylethyl ketone | n-Heptane | 25 | 1.548 | 112 |
| Methylethyl ketone | n-Hexane | 25 | 1.775 | 112 |
|  |  | 37.8 | 2.22 | 52 |
| Methylethyl ketone | 2-Methyl furan | 25 | 84.0 | 109 |
| Methylethyl ketone | Monochlorobenzene | 25 | 2.36 | 68 |
| Methylethyl ketone | Naphtha | 26.7 | 0.885† | 6 |
| Methylethyl ketone | 1,1,2-Trichloroethane | 25 | 3.44 | 68 |
| Methylethyl ketone | Trichloroethylene | 25 | 3.27 | 68 |
| Methylethyl ketone | 2,2,4-Trimethylpentane | 25 | 1.572 | 64 |
| Nickelous chloride | Dioxane | 25 | 0.0017 | 93 |
| Nicotine | Carbon tetrachloride | 25 | 9.50 | 34 |
| Phenol | Methylnaphthalene | 25 | 7.06 | 82 |
| α-Picoline | Benzene | 20 | 8.75 | 14 |
| α-Picoline | Diisobutylene | 20 | 1.360 | 14 |
| α-Picoline | Heptanes (mixed) | 20 | 1.378 | 14 |
| α-Picoline | Methylcyclohexane | 20 | 1.00 | 14 |
| iso-Propanol | Benzene | 25 | 0.276 | 69 |
| iso-Propanol | Carbon tetrachloride | 20 | 1.405 | 25 |
| iso-Propanol | Cyclohexane | 25 | 0.0282 | 123 |
| iso-Propanol | Cyclohexene | 15 | 0.0583 | 124 |
|  |  | 25 | 0.0682 | 124 |
|  |  | 35 | 0.1875 | 124 |
| iso-Propanol | Diisopropyl ether | 25 | 0.406 | 35 |
| iso-Propanol | Ethyl acetate | 0 | 0.200 | 5 |
|  |  | 20 | 1.205 | 5 |
| iso-Propanol | Tetrachloroethylene | 25 | 0.388 | 7 |
| iso-Propanol | Toluene | 25 | 0.1296 | 121 |

TABLE 6-continued

Selected List of Ternary Systems

| Component B | Component S | Temp., °C. | $K_1$ | Ref. |
|---|---|---|---|---|
| n-Propanol | iso-Amyl alcohol | 25 | 3.34 | 20 |
| n-Propanol | Benzene | 37.8 | 0.650 | 61 |
| n-Propanol | n-Butanol | 37.8 | 3.61 | 61 |
| n-Propanol | Cyclohexane | 25 | 0.1553 | 123 |
| | | 35 | 0.1775 | 123 |
| n-Propanol | Ethyl acetate | 0 | 1.419 | 5 |
| | | 20 | 1.542 | 5 |
| n-Propanol | n-Heptane | 37.8 | 0.540 | 61 |
| n-Propanol | n-Hexane | 37.8 | 0.326 | 61 |
| n-Propanol | n-Propyl acetate | 20 | 1.55 | 106 |
| | | 35 | 2.14 | 106 |
| n-Propanol | Toluene | 25 | 0.299 | 2 |
| Propionic acid | Benzene | 30 | 0.598 | 57 |
| Propionic acid | Cyclohexane | 31 | 0.1955 | 84 |
| Propionic acid | Cyclohexene | 31 | 0.303 | 84 |
| Propionic acid | Ethyl acetate | 30 | 2.77 | 87 |
| Propionic acid | Ethyl butyrate | 26 | 1.470 | 87 |
| Propionic acid | Ethyl propionate | 28 | 0.510 | 87 |
| Propionic acid | Hexanes (mixed) | 31 | 0.186 | 84 |
| Propionic acid | Methyl butyrate | 30 | 2.15 | 66 |
| Propionic acid | Methylisobutyl carbinol | 30 | 3.52 | 83 |
| Propionic acid | Methylisobutyl ketone | 26.7 | 1.949* | 49 |
| Propionic acid | Monochlorobenzene | 30 | 0.513 | 57 |
| Propionic acid | Tetrachloroethylene | 31 | 0.167 | 84 |
| Propionic acid | Toluene | 31 | 0.515 | 84 |
| Propionic acid | Trichloroethylene | 30 | 0.496 | 57 |
| Pyridine | Benzene | 15 | 2.19 | 110 |
| | | 25 | 3.00 | 105 |
| | | 25 | 2.73 | 120 |
| | | 45 | 2.49 | 110 |
| | | 60 | 2.10 | 110 |
| Pyridine | Monochlorobenzene | 25 | 2.10 | 77 |
| Pyridine | Toluene | 25 | 1.900 | 120 |
| Pyridine | Xylene | 25 | 1.260 | 120 |
| Sodium chloride | iso-Butanol | 25 | 0.0182 | 36 |
| Sodium chloride | n-Ethyl-sec-butyl amine | 32 | 0.0563 | 24 |
| Sodium chloride | n-Ethyl-tert-butyl amine | 40 | 0.1792 | 24 |
| Sodium chloride | 2-Ethylhexyl amine | 30 | 0.187 | 24 |
| Sodium chloride | 1-Methyldiethyl amine | 39.1 | 0.0597 | 24 |
| Sodium chloride | 1-Methyldodecyl amine | 30 | 0.693 | 24 |
| Sodium chloride | n-Methyl-1,3-dimethylbutyl amine | 30 | 0.0537 | 24 |
| Sodium chloride | 1-Methyloctyl amine | 30 | 0.589 | 24 |
| Sodium chloride | tert-Nonyl amine | 30 | 0.0318 | 24 |
| Sodium chloride | 1,1,3,3-Tetramethyl butyl amine | 30 | 0.072 | 24 |
| Sodium hydroxide | iso-Butanol | 25 | 0.00857 | 36 |
| Sodium nitrate | Dioxane | 25 | 0.0246 | 95 |
| Succinic acid | Ethyl ether | 15 | 0.220 | 33 |
| | | 20 | 0.198 | 33 |
| | | 25 | 0.1805 | 33 |
| Trimethyl amine | Benzene | 25 | 0.857 | 51 |
| | | 70 | 2.36 | 51 |

Component A = feed solvent, component B = solute, and component S = extraction solvent. $K_1$ is the distribution coefficient in weight-fraction solute y/x for the tie line of lowest solute concentration reported. Ordinarily, K will approach unity as the solute concentration is increased.
*Concentrations in lb.-moles/cu. ft.
†Concentrations in volume fraction.

While in accordance with the patent statutes the best mode and preferred embodiment have been set forth, the scope of the invention is not intended to be limited thereto, but only by the scope of the attached claims.

What is claimed is:

1. A process for removing an immiscible lipophilic or a hydrophilic liquid respectively from a continuous hydrophilic or a lipophilic liquid phase, comprising the steps of:
   1) forming a filter comprising a specific weight ratio of hydrophobic fibers to hydrophilic fibers;
   2) determining an initial slope of a weight gain take-up versus time plot of the immiscible liquid by said filter;
   3) determining an initial slope of weight gain take-up versus time plot of said continuous liquid by said filter;
   4) calculating an L/H ratio from said initial slope of the plot of said immiscible liquid and of said initial slope of the plot of said continuous liquid and obtaining a wettability value for each;
   5) forming a plurality of filters comprising different weight ratios of said hydrophobic fibers to said hydrophilic fibers from a range of from about 90% by weight of said hydrophobic fibers to about 10% by weight, or any portion thereof, of hydrophobic fibers with the remaining weight percent being said hydrophilic fibers;
   repeating steps 2), 3), and 4) with respect to each weight ratio of said lipophobic fibers to said hydrophilic fibers in step 5);

plotting a wettability range from said L/H wettability values obtained from said plurality of said different weight ratios of said hydrophobic fibers to said hydrophilic fibers; and utilizing a filter having a wetness value within a weight range of from about 20% to about 80% of hydrophobic fibers to hydrophilic fibers to coalesce said immiscible liquid phase within said continuous liquid phase.

2. The process of claim 1, wherein the fiber diameter of said hydrophobic fibers and said hydrophilic fibers, independently, is from about 0.1 to about 500 microns, and wherein said L/H wettability values of said different weight ratios of said hydrophobic fibers to said hydrophilic fibers, independently, is from about 1 to about 3,000.

3. The process of claim 2, wherein said fiber diameter of said hydrophobic fibers and said hydrophilic fibers, independently, is from about 0.5 to about 50 microns, and wherein said L/H wettability values of said different weight ratios of said hydrophobic fibers to said hydrophilic fibers, independently, is from about 2 to about 2,000, and wherein said filter has a wetness value within a weight range of from about 30% to about 70% of hydrophobic fibers to hydrophilic fibers.

4. The process of claim 3, wherein said L/H wettability values of said different weight ratios of said hydrophobic fibers to said hydrophilic fibers, independently, is from about 2 to about 150, and wherein said filter has a wetness value within a weight range of from 35% to about 65% of hydrophobic fibers to hydrophilic fibers.

5. The process of claim 1, wherein said hydrophobic fibers comprise one or more polymers including polyethylene, polypropylene, nomex, polyester, a halogen-containing polymer, rubber, polyurethane, polycarbonate, or a silicone polymer; one or more minerals such as zinc oxide; and fibers that contain silane coatings thereon; and wherein said hydrophilic fibers comprise one or more glasses including sodium glass, boron glass, phosphate glass, or B-glass; one or more minerals including alumina, titania, or silica; one or more metals including aluminum or aluminum alloys; and one or more polymers including cellulose acetate, poly(methylmethacrylate), polyethylene oxide, or nylon.

6. The process of claim 4, wherein said hydrophobic fibers include one or more polyethylene, polypropylene, or polyester, and halogen-containing fibers, and wherein said hydrophilic fibers comprise glass fibers.

* * * * *